United States Patent
Singh et al.

(10) Patent No.: US 12,099,572 B2
(45) Date of Patent: Sep. 24, 2024

(54) SYSTEMS AND METHODS TO ESTIMATE RATE OF IMPROVEMENT FOR ALL TECHNOLOGIES

(71) Applicant: Technext Inc., Richmond, MA (US)

(72) Inventors: Anuraag Singh, Cambridge, MA (US); Christopher L. Magee, Richmond, MA (US)

(73) Assignee: Technext Inc.

( * ) Notice: Subject to any disclaimer, the term of this patent is extended or adjusted under 35 U.S.C. 154(b) by 0 days.

(21) Appl. No.: 17/224,082

(22) Filed: Apr. 6, 2021

(65) Prior Publication Data
US 2022/0114384 A1 Apr. 14, 2022

Related U.S. Application Data

(60) Provisional application No. 63/006,433, filed on Apr. 7, 2020.

(51) Int. Cl.
| | |
|---|---|
| *G06F 16/00* | (2019.01) |
| *G06F 16/903* | (2019.01) |
| *G06F 18/2134* | (2023.01) |
| *G06F 18/22* | (2023.01) |
| *G06F 18/2413* | (2023.01) |

(52) U.S. Cl.
CPC ...... *G06F 18/21342* (2023.01); *G06F 16/903* (2019.01); *G06F 18/22* (2023.01); *G06F 18/24137* (2023.01); *G06F 2216/11* (2013.01)

(58) Field of Classification Search
None
See application file for complete search history.

(56) References Cited

U.S. PATENT DOCUMENTS

| | | | | |
|---|---|---|---|---|
| 7,415,445 | B2 * | 8/2008 | Forman | G06F 18/211 |
| | | | | 706/20 |
| 8,065,307 | B2 * | 11/2011 | Haslam | G06F 16/382 |
| | | | | 707/750 |
| 8,321,425 | B2 * | 11/2012 | Custis | G06F 16/3346 |
| | | | | 707/750 |
| 8,756,173 | B2 * | 6/2014 | Hunzinger | G06F 18/2411 |
| | | | | 706/12 |
| 9,232,063 | B2 * | 1/2016 | Romano | H04M 3/2218 |
| 10,282,378 | B1 * | 5/2019 | Eusebi | G06F 16/285 |
| 10,417,532 | B2 * | 9/2019 | Liang | G06F 18/2411 |
| 10,679,008 | B2 * | 6/2020 | Dubey | G06F 16/3347 |

(Continued)

OTHER PUBLICATIONS

Alstott et al., (hereinafter Alstott") article entitled "Mapping technology space by normalizing patent networks) (Year: 2017).*

(Continued)

*Primary Examiner* — Jean M Corrielus
(74) *Attorney, Agent, or Firm* — Thomas Oakley PLLC

(57) ABSTRACT

Systems and methods for predicting yearly performance improvement rates for nearly all definable technologies for the first time are provided. In one embodiment, a correspondence of all patents within the U.S. patent system to a set of technology domains is created. From the identified patent sets, the invention may calculate average centrality of the patents in each domain to predict improvement rates, following a patent network-based methodology. Also disclosed is a system to intake a user technology search query and match user intent with the technology domain as well as the corresponding improvement rate.

9 Claims, 9 Drawing Sheets

(56) References Cited

U.S. PATENT DOCUMENTS

| | | | |
|---|---|---|---|
| 11,334,789 B2* | 5/2022 | Towal | G06N 3/08 |
| 11,995,522 B2* | 5/2024 | Lourentzou | G06F 18/217 |
| 2004/0059697 A1* | 3/2004 | Forman | G06F 18/211 |
| | | | 706/46 |
| 2005/0097436 A1* | 5/2005 | Kawatani | G06K 9/6215 |
| | | | 707/E17.09 |
| 2007/0294232 A1* | 12/2007 | Gibbs | G06Q 10/10 |
| | | | 707/999.005 |
| 2008/0091620 A1* | 4/2008 | Vollenweider | G06Q 40/06 |
| | | | 705/36 R |
| 2008/0154848 A1* | 6/2008 | Haslam | G06F 16/382 |
| 2009/0043797 A1* | 2/2009 | Dorie | G06F 16/355 |
| | | | 707/999.102 |
| 2010/0057533 A1* | 3/2010 | Martinez Ruiz | G06Q 10/06 |
| | | | 705/311 |
| 2014/0181118 A1* | 6/2014 | Lee | G06Q 50/184 |
| | | | 707/746 |
| 2014/0188739 A1* | 7/2014 | Lee | G06Q 10/10 |
| | | | 705/310 |
| 2014/0195443 A1* | 7/2014 | Lee | G06Q 10/00 |
| | | | 705/310 |
| 2015/0078670 A1* | 3/2015 | Reibman | G06V 10/993 |
| | | | 382/209 |
| 2015/0189086 A1* | 7/2015 | Romano | H04M 3/5175 |
| | | | 379/265.09 |
| 2016/0275414 A1* | 9/2016 | Towal | G06F 18/214 |
| 2016/0358077 A1* | 12/2016 | Benson | G06F 16/245 |
| 2018/0173698 A1* | 6/2018 | Dubey | G06F 16/3347 |
| 2018/0197044 A1* | 7/2018 | Wu | G06T 7/00 |

OTHER PUBLICATIONS

Choi et al., Exploring Technological Trends in Logistics: Topic Modeling-Based Patent Analysis (Year: 2018).*

* cited by examiner 2371 patents found for search term "turbocharger".

Continue Searching or scroll down to provide feedback. Please click Domain ID to read Top20 patents for each domain.

ESTIMATED IMPROVEMENT RATES FOR TOP 5 MATCHING DOMAINS

| Domain_ID | Estimated Improvement Rate (p.a) | Domain Size | Patents Matched | MPR |
|---|---|---|---|---|
| 60F02B | 23.0 | 1245.0 | 515 | 0.32 |
| 60F02D | 79.5 | 171.0 | 51 | 0.16 |
| 123F02B | 14.0 | 20448.0 | 535 | 0.13 |
| 415F01D | 7.3 | 7683.0 | 344 | 0.09 |
| 60F01N | 64.7 | 6832.0 | 137 | 0.04 |

Estimated Improvement Rate (p.a) is the annual improvement rate of the technology in percent. If it's above 42% that means the technology is improving faster than integrated chips (Moore's law).

Domain size is the number of patents in the technology and Patents Matched is the number of patents which contain the keyword you searched for.

We use MPR as a measure of relevance and anything above 0.1 is usually a decent match. Top 20 patents from the domain are a good indicator of whether the technology matches.

Figure 7

TOP20 PATENTS FROM DOMAIN 60F02B.

Please press browser back button to go back to results.

| patent number | title | abstract | organization |
|---|---|---|---|
| 4891946 | Apparatus for control of operational characteristics of supercharger in internal combustion engine | An apparatus is provided for controlling the operational characteristics of a supercharger in an internal combustion engine with the supercharger, including a compressor. The apparatus comprises a pressure sensor positioned in an intake passage downstream of the compressor for detecting the pressure of the compressor at a revolution sensor operatively coupled to the engine for detecting the revolution speed of the engine. An arithmetic means has its inputs coupled to the pressure sensor and revolution sensor and arithmetically operates on the output signals of the pressure sensor and revolution sensor in accordance with predetermined control characteristics for providing an output signal in accordance therewith. A control means is coupled to the output of the arithmetic means for controlling the pressure of the compressor in accordance with the output signal of the arithmetic means, and changing means are provided for manually changing the predetermined control characteristics of the arithmetic means. | Honda Giken Kogyo Kabushiki Kaisha |
| 4716734 | Internal combustion engine equipped with a supercharger and an idling speed control system | An internal combustion engine equipped with a supercharger and an idling speed control system comprises a combustion chamber provided with an exhaust passage and an inlet passage in which the supercharger is provided, a throttle valve provided at a downstream portion of the inlet passage compared with the supercharger, an intercooler provided at the downstream portion of the inlet passage compared with the supercharger, a bypass passage | Mazda Motor Corporation |

Figure 8

PROVIDE FEEDBACK

| Prefect match (5) | Good match (4) | Adequate match (3) | Bad match (2) | Completely missed (1) |
|---|---|---|---|---|

Was the domain shown accurate (is it pointing towards the correct direction)?    1 to 5 _____

Was the domain shown precise (level of abstraction- is it too narrow or too broad)?    1 to 5 _____

[Submit]

Figure 9

SYSTEMS AND METHODS TO ESTIMATE RATE OF IMPROVEMENT FOR ALL TECHNOLOGIES

CROSS-REFERENCE TO RELATED APPLICATIONS

The present invention is related to, and claims priority from, U.S. Provisional Patent Application Ser. No. 63/006,433 filed Apr. 7, 2020, the disclosure of which is hereby incorporated by this reference in its entirety.

BACKGROUND OF THE INVENTION

The present disclosure relates to the use of patent data to estimate a rate of improvement for any technology domain, and more particularly provides systems and methods that decompose patents from a certain grouping (e.g., all United States patents) into technological domains to provide such estimates and allows for accessible systems that can be searched to obtain information about technologies and estimated improvement rates.

The pace of technological change has been discussed as a cause for rising anxiety and renewed concerns about social impacts of technological change. See Jones, B. F., 2009. The Burden of Knowledge and the "Death of the Renaissance Man": Is Innovation Getting Harder? The Review of Economic Studies 76, 283-317; Gordon, R. J., 2012. Is U.S. Economic Growth Over? Faltering Innovation Confronts the Six Headwinds (Working Paper No. 18315). National Bureau of Economic Research; Mokyr, J., Vickers, C., Ziebarth, N. L., 2015. The History of Technological Anxiety and the Future of Economic Growth: Is This Time Different? Journal of Economic Perspectives 29, 31-50; Bloom, N., Jones, C. I., Van Reenen, J., Webb, M., 2017. Are Ideas Getting Harder to Find? (Working Paper No. 23782). National Bureau of Economic Research; Groshen, E. L., Helper, S., MacDuffie, J. P., Carson, C., 2019. Preparing US workers and employers for an autonomous vehicle future (No. No. 19-036), Upjohn Institute Technical Report. W. E. Upjohn Institute for Employment Research, Kalamazoo, Mich.; O'Donovan, N., 2019. From Knowledge Economy to Automation Anxiety: A Growth Regime in Crisis? New Political Economy 0, 1-19; Autor, D., 2019. Work of the Past, Work of the Future (Working Paper No. 25588). National Bureau of Economic Research. There have been academic studies of probability of job loss due to progress in specific technologies such as machine learning, mobile robotics among others. See Frey, C. B., Osborne, M. A., 2017. The future of employment: How susceptible are jobs to computerisation? Technological Forecasting and Social Change 114, 254-280; Brynjolfsson, E., Mitchell, T., 2017. What can machine learning do? Workforce implications. Science 358, 1530-1534; Brynjolfsson, E., Mitchell, T., Rock, D., 2018. What Can Machines Learn, and What Does It Mean for Occupations and the Economy? AEA Papers and Proceedings 108, 43-47. In popular forums, technological change and disruption have been blamed for large scale layoffs by large multinationals (for instance—The Weekly|G. M. Leaves Lordstown Behind in Hard Bet on Future, 2019. The New York Times). There have also been attempts to attribute significant political changes such as the US presidential elections to technological change, specifically advances in automation (Frey, C. B., Berger, T., Chen, C., 2017. Political machinery: Automation anxiety and the 2016 US presidential election. University of Oxford). Therefore, a granular yet broad and systematic understanding of technology and the pace of technological change appears to be a key step in enabling a more useful understanding of technological change and its societal effect.

However, most discussions of technological change are based around sector-specific changes or focuses on indirect and aggregate measures of the rate of technological change, such as total factor productivity. Even in the seminal 1962's NBER book "The rate and direction of inventive activities", edited by Richard Nelson (1962) or in Lerner and Stern's 50th anniversary update "The rate and direction of inventive activity revisited" (2012), which are two landmark studies in the field, arguably more emphasis is devoted to the direction rather than the rate of technological change. When the pace of change is discussed in the literature it is done either in a qualitative way or by relying on TFP analysis or other very indirect and noisy measures like the number of patents or R&D investments in a field, which, in addition, are measures of inputs or intermediate steps in the process of technological change, not of its output. Moreover, the distinct boundary of the technology being studied are usually not defined clearly. Despite the central importance of technology in driving economic growth (Schumpeter, J. A., 1935. The Analysis of Economic Change. The Review of Economics and Statistics 17, 2-10; Solow, R. M., 1957. Technical Change and the Aggregate Production Function. The Review of Economics and Statistics 39, 312-320; Romer, P. M., 1990. Endogenous Technological Change. Journal of Political Economy 98, S71-S102), there have been limited attempts at a systematic survey of the technological toolbox available to humanity that go beyond looking at a single technology classification system. This invention builds on previous work and may be used to describe 97.2% of the US patent system as a set of 1757 discrete technology domains and quantitatively assess each domain for its improvement potential.

The rate of improvement of performance for a technology is an important indicator of the potential future importance of that technology (Hoisl, K., Stelzer, T., Biala, S., 2015. Forecasting technological discontinuities in the ICT industry. Research Policy 44, 522-532). Consistent empirical evidence, accumulating since 1965, using datasets of performance time series for a variety of different technologies, shows that performance improvements for individual technologies follow exponential trends over time. This implies that technologies experience constant yearly rates of improvement, albeit having very different rates. See Moore, G. E., 1965. Cramming more components onto integrated circuits. Electronics Mag. 38; Martino, J., 1971. Examples of technological trend forecasting for research and development planning. Technological Forecasting and Social Change 2, 247-260; Nordhaus, W. D., 1996. The Economics of New Goods, in: Bresnahan, T. F., Gordon, R. J. (Eds.); Moore, G. E., 2006. Understanding Moore's Law: Four Decades of Innovation. Chemical Heritage Foundation; Koh, H., Magee, C. L., 2006. A functional approach for studying technological progress: Application to information technology. Technological Forecasting and Social Change 73, 1061-1083; Nordhaus, W., 2007. Two Centuries of Productivity Growth in Computing. The Journal of Economic History 67, 128-159; Koh, H., Magee, C. L., 2008. A functional approach for studying technological progress: Extension to energy technology. Technological Forecasting and Social Change 75, 735-758; Nagy, B., Farmer, J. D., Bui, Q. M., Trancik, J. E., 2013. Statistical Basis for Predicting Technological Progress. PLoS One 8; Koomey, J. G., Berard, S., Sanchez, M., Wong, H., 2011. Web Extra Appendix: Implications of Historical Trends in the Electrical Efficiency of Computing. IEEE Annals of the History of Computing 33, S1-S30; Farmer, J. D., Lafond, F., 2016. How predictable is technological progress? Research Policy 45, 647-665; Magee, C. L., Basnet, S., Funk, J. L., Benson, C. L., 2016. Quantitative empirical trends in technical performance. Technological Forecasting and Social Change 104, 237-246. Particularly significant is the work of Farmer and Lafond (2016) which rigorously shows that long-term trends are random walks around an exponential in time, which implies that rather than trying to predict the next data point in performance, one should focus on predicting the underlying improvement rate. Based on this body of prior work, reliable empirical measures for 30 technological domains may be derived. However, the patent sets identified for those technologies only cover less than 15% of the patents in the US patent system. Moreover, the rate of improvement can only be empirically estimated when substantial performance measurements are made over long time periods (Benson, C. L., 2014. Cross-domain comparison of quantitative technology improvement using patent derived characteristics (Thesis). Massachusetts Institute of Technology). In some large technological fields, including software and clinical medicine, such measures have rarely, if ever, been made.

The major purpose of this invention is to provide predictions of the performance improvement rates for the thousands of domains not accessed by empirical measurement. To our knowledge, this invention is the first to enable completing a full-breadth yet granular survey of technological improvement rates and this is presently only doable by the use of a non-empirical, patent-based method trained with the 30 technology domains for which empirical performance data is available emulating Triulzi, G., Alstott, J., Magee, C. L., 2020. Estimating technology performance improvement rates by mining patent data. Technological Forecasting and Social Change 158, 120100.

The instant invention makes available technology predictions almost instantaneously. Currently the only way to perform technology predictions is through extrapolation from past performance data. That approach requires painstaking data collection which takes several months and also reasonable technology modeling skills to create models of technology improvement and adoption. Often large corporations hire consultancy companies or fund multi-million-dollar, multi-year projects at universities to accomplish this same work. This takes too much time and manual effort. Often times the decision window passes before the analysis can be completed.

The instant invention may be used by R & D engineers to choose between different technologies while designing new products, R & D managers to prioritize key technologies and predict technology breakthroughs, technology project managers to forecast likelihood of meeting long-term technology development plans, and technology leaders to prioritize technology portfolio development.

For instance, an automotive designer inspecting a prototype of a powertrain system may look at an engine subsystem and might become concerned about the likelihood of meeting emission requirements in the future. The instant invention would enable them to quickly search for and obtain the rate of improvement of the engine subsystem. Based on that information they could determine the likelihood of meeting future requirements given current performance. They might decide to swap the design with a faster improving subsystem (such as fuel cells) because on the current trajectory, the existing subsystem is unlikely to meet future emission requirements.

Prior related studies indicate that such results can be helpful in informing technological decisions for firms performing R&D (Hoisl et al., 2015) and investment portfolio design when assets are technologies (Way, R., Lafond, F., Lillo, F., Panchenko, V., Farmer, J. D., 2019. Wright meets Markowitz: How standard portfolio theory changes when assets are technologies following experience curves. Journal of Economic Dynamics and Control 101, 211-238).

Furthermore, it is plausible to hypothesize that faster improving technologies have faster product life cycles. Since the latter has been shown to be correlated with successful catching-up by latecomer firms (Lee, K., 2013. Schumpeterian Analysis of Economic Catch-up: Knowledge, Path-Creation, and the Middle-Income Trap. Cambridge University Press) and to mediate the relationship between entrepreneurial orientation and performance (Shan, P., Song, M., Ju, X., 2016. Entrepreneurial orientation and performance: Is innovation speed a missing link? Journal of Business Research 69, 683-690), this invention may also help strategy design by latecomer firms and entrepreneurs looking for technology-pushed opportunities. Finally, this invention can inform policy makers trying to understand the social and economic implications of technological change. In particular, to design industrial and social security policies to counteract "technology anxiety" (Mokyr et al., 2015; O'Donovan, 2019; Groshen et al., 2019), prioritize R&D investments or favor employment transition to fast-improving areas (thereby counteracting the negative effects of creative destruction).

This work is based upon the prior empirical studies assessing performance improvement in 30 technologies defined as technological domains-sets of artifacts fulfilling a specific function using a specific branch of scientific knowledge (Magee et al., 2016). Existing work had demonstrated that patents corresponding to technological domains defined in this way can be reliably found using the classification overlap method (COM) (Benson, C. L., Magee, C. L., 2013. A hybrid keyword and patent class methodology for selecting relevant sets of patents for a technological field. Scientometrics 96, 69-82 and Benson, C. L., Magee, C. L., 2015a. Technology structural implications from the extension of a patent search method. Scientometrics 102, 1965-1985) and that such patent sets can be used to estimate improvement rates (Benson, C. L., Magee, C. L., 2015b. Quantitative Determination of Technological Improvement from Patent Data. PLOS ONE 10, e0121635). Recently, Triulzi et. al. (2020) have shown that accurate and reliable estimates of the rate of performance improvement can be obtained for technological domains based upon the average centrality of patents (in the patent citation network) in each domain.

This invention builds on those insights and uses patent network centrality estimation methods and invert, automate and extend COM to the entire US patent system to provide predictions of performance improvement rates for the widest possible set of technologies. There is solid evidence that these rates are constant in the series of previously mentioned studies of empirical performance data and the key insight robustly shown by Farmer and Lafond (2016) discussed above.

Also disclosed herein is a new online interactive system where domains corresponding to technology-related keywords can be found along with their improvement rates. The user can input a keyword describing the technology of interest through a user-friendly interface and the system returns a prediction of improvement for the technological domain, an automated measure of quality of match (called MPR) and patent sets so that the reader can judge the semantic quality of the match.

Research into Technological Change has Operated at Three Distinct Levels

On a detailed level, previous research, in particular in the field of technology and economic history, has usefully studied discrete technological inventions-such as Nelson's (1962) and Riordan and Hoddeson's (1999) study of the invention of the transistor (Nelson, Richard, 1962. The Link Between Science and Invention: The Case of the Transistor, in: NBER Chapters. National Bureau of Economic Research, Inc, pp. 549-584; Riordan, M., Hoddeson, L., Herring, C., 1999. The invention of the transistor, in: More Things in Heaven and Earth. Springer, pp. 563-578), Enos's (1962) study of the series of inventions related to oil refining processes (Enos, J. L., 1962. Invention and Innovation in the Petroleum Refining Industry, in: NBER Chapters. National Bureau of Economic Research, Inc, pp. 299-322), the several studies on key inventions that characterized the first industrial revolution (Frenken, K., Nuvolari, A., 2004. The early development of the steam engine: an evolutionary interpretation using complexity theory. Ind Corp Change 13, 419-450; Nuvolari, A., 2004. Collective invention during the British Industrial Revolution: the case of the Cornish pumping engine. Cambridge J Econ 28, 347-363) among others. Some have proposed lists of discrete inventions (such as Tushman and Anderson's list of technological discontinuities (Tushman, M. L., Anderson, P., 1986. Technological Discontinuities and Organizational Environments. Administrative Science Quarterly 31, 439-465) or the survey of significant innovations compiled at Science Policy Research Unit (SPRU) at the University of Sussex (Robson, M., Townsend, J., Pavitt, K., 1988. Sectoral patterns of production and use of innovations in the UK: 1945-1983. Research Policy 17, 1-14)). Others have analyzed prizes and awards for important inventions (Fontana, R., Nuvolari, A., Shimizu, H., Vezzulli, A., 2012. Schumpeterian patterns of innovation and the sources of breakthrough inventions: evidence from a data-set of R&D awards. J Evol Econ 22,785-810; Capponi, G., Criscuolo, P., Martinelli, A., Nuvolari, A., 2019. Profiting from innovation: Evidence from a survey of Queen's Awards winners. Structural Change and Economic Dynamics 49, 155-169). There are however, difficulties in creating accurate and complete lists of inventions for tracking technological change. The process is labor intensive and requires considerable expert knowledge (Godin, B., 2007. Science, accounting and statistics: The input-output framework. Research Policy 36, 1388-1403) and tends to overestimate the importance of singular inventions when much progress occurs through a series of inventions over time. Moreover, it is well-known that technologies have extensive interaction with one another (often called spillover) in that technological ideas can be used for various purposes and that prior technological and scientific ideas are at the root of even the most novel technologies (Usher, A. P., 1954. A History of mechanical inventions. Abbott Payson Usher . . . Revised edition. Mass.: Harvard University Press, Cambridge; Koestler, A., 1961. The act of creation. Hutchinson, London; Rosenberg, N., 1982. Inside the Black Box: Technology and Economics. Cambridge University Press; Dasgupta, S., 1996. Technology and creativity. Oxford University Press, New York; Verspagen, B., 1997. Measuring Intersectoral Technology Spillovers: Estimates from the European and US Patent Office Databases. Economic Systems Research 9, 47-65; Youn, H., Strumsky, D., Bettencourt, L. M. A., Lobo, J., 2015. Invention as a combinatorial process: evidence from US patents. Journal of The Royal Society Interface 12, 20150272; Basnet, S., Magee, C. L., 2016. Modeling of technological performance trends using design theory. Design Science 2).

On the broadest level, technology has been considered in neoclassical work as a single integrated unit or a black box (Solow, 1957). This macro perspective on the relationship between technology and growth has been complemented by a series of research efforts aiming at measuring productivity growth and productivity differentials across time, industries or countries (Brynjolfsson, E., 1993. The Productivity Paradox of Information Technology. Commun. ACM 36, 66-77; Fagerberg, J., 1994. Technology and International Differences in Growth Rates. Journal of Economic Literature 32, 1147-1175; Fagerberg, J., 2000. Technological Progress, Structural Change and Productivity Growth: A Comparative Study (Working Paper No. 5). Centre for Technology, Innovation and Culture, University of Oslo; Gordon, R. J., 2000. Does the "New Economy" Measure Up to the Great Inventions of the Past? Journal of Economic Perspectives 14, 49-74; Acemoglu, D., Robinson, J., 2010. The Role of Institutions in Growth and Development. Review of Economics and Institutions 1; Gordon, R. J., 2017. The Rise and Fall of American Growth: The U.S. Standard of Living since the Civil War. Princeton University Press). However, these efforts focused on measuring the effect of technological change, without necessarily explaining its sources and mechanism.

To do that, it is important to open the technological black box, as argued by Rosenberg, (1982) and not treat technology as a monolith. The body of work on sectoral (Malerba, F., Orsenigo, L., 1995. Schumpeterian patterns of innovation. Camb. J. Econ. 19, 47-65; Breschi, S., Malerba, F., Orsenigo, L., 2000. Technological Regimes and Schumpeterian Patterns of Innovation. The Economic Journal 110, 388-410; Malerba, F., 2002. Sectoral systems of innovation and production. Research Policy, Innovation Systems 31, 247-264), technological (Hekkert, M. P., Suurs, R. A., Negro, S. O., Kuhlmann, S., Smits, R., 2007. Functions of innovation systems: A new approach for analysing technological change. Technological forecasting and social change 74, 413-432; Bergek, A., Jacobsson, S., Carlsson, B., Lindmark, S., Rickne, A., 2008. Analyzing the functional dynamics of technological innovation systems: A scheme of analysis. Research Policy 37, 407-429; Markard, J., Truffer, B., 2008. Technological innovation systems and the multi-level perspective: Towards an integrated framework. Research Policy 37, 596-615) and national (Lundvall, B. A., 1992. National Systems of Innovation: Towards a Theory of Innovation and Interactive Learning. Pinter Publishers; Nelson, R. R., 1993. National innovation systems: a comparative analysis. Oxford university press) innovation systems have expanded on this view by showing how these factors differ systematically across sectors and countries due, in great part, to the characteristics of the technological base.

Attempts to bridge the gap between discrete technologies and the black box have been an important aspect of research on technological change. Further advances in our understanding of the process of technological change came from its characterization as "progress", defined as the improvement of "multi-dimensional trade-offs", along precise technological trajectories (Dosi, G., 1982. Technological paradigms and technological trajectories: A suggested interpretation of the determinants and directions of technical change. Research Policy 11, 147-162) and by the development of methods to map and analyze these trajectories empirically (Verspagen, B., 2007. Mapping Technological Trajectories As Patent Citation Networks: A Study On The History Of Fuel Cell Research. Advances in Complex Systems (ACS) 10, 93-115; Castaldi, C., Fontana, R., Nuvolari, A., 2009. 'Chariots of fire': the evolution of tank technology, 1915-1945. J Evol Econ 19, 545-566; Nuvolari, A., Verspagen, B., 2009. Technical choice, innovation, and British steam engineering, 1800-501. The Economic History Review 62, 685-710). A crucial advance in the field, came from the development of precise definition of technology and the diffusion of a shared understanding of it. In his seminal work, Dosi (1982) defines technology as combinations of "theoretical" and "practical" know-how, methods, processes, experiences as well as their embodiments in physical devices and equipment. Arthur adds a complementary perspective and defines technology as "a means to fulfill a purpose, and it does this by exploiting some effect" in his work, the structure of invention (Arthur, W. B., 2007. The structure of invention. Research policy 36, 274-287). Magee et al. (2016) have built on prior work by Dosi and Arthur to define Technological Domain (TD) as "The set of artifacts that fulfill a specific generic function utilizing a particular, recognizable body of knowledge." This definition introduces TD as a means to avoid the confusion associated with the word technology which has come to mean widely different things to different people. Magee et al. (2016) have further employed the concept of technological domains to obtain reliable empirical estimates of technology improvement rates for 30 domains over periods of decades.

In sum, the field of research of technological change now has precise definitions of what technology is, how it evolves, why it does it in ways that differs across sectors and countries and how they affect economic growth differentials at these two levels. Nevertheless, despite these extensive efforts to study what determines the direction of technological change and how it evolved in selected industries, the rate of improvement of technological advances and its differences across technologies, a key determinant of economic growth differentials, has not been studied convincingly and systematically at scale. Comparative studies of the pace of technological progress so far could only rely on an indirect, aggregate and noisy measure like total factor productivity or indicators like R&D investments or number of patents that can at best measure inputs or intermediates results of the process of technological change, not its output. This disclosure and invention contribute to filling this important gap by providing the first method capable of providing a comprehensive and granular survey of yearly performance improvement rates for 1757 technologies, albeit predicted, not empirically observed, by applying a predicting method trained with empirically observed performance data for 30 technologies, for which it proved accurate and reliable.

Long Term Performance Improvements in Technologies can be Modeled as Exponential Change Performance over time, of components or product generations, has sometimes been characterized by S-curves (Utterback, J. M., Abernathy, W. J., 1975. A dynamic model of process and product innovation. Omega 3, 639-656; Sahal, D., 1979. A Theory of Progress Functions. A I I E Transactions 11,23-29; Tushman and Anderson, 1986; Christensen, C. M., 1992a. Exploring the limits of the technology S-curve. Part II: Architectural technologies. Production and Operations Management 1, 358-366; Christensen, C. M., 1992b. Exploring the limits of the technology S-curve. Part I: component technologies. Production and operations management 1, 334-357; Ayres, R. U., 1994. Toward a non-linear dynamics of technological progress. Journal of Economic Behavior & Organization 24, 35-69; Christensen, C. M., 1997. The innovator's dilemma: when new technologies cause great firms to fail. Harvard Business School Press, USA; Schilling, M. A., Esmundo, M., 2009. Technology S-curves in renewable energy alternatives: Analysis and implications for industry and government. Energy Policy 37, 1767-1781). However, in his seminal paper Christensen (1992b) points out that the flattening part of the S-curve for individual components in his data is a firm-specific phenomenon. Similarly, Henderson, R., 1995. Of life cycles real and imaginary: The unexpectedly long old age of optical lithography. Research Policy 24, 631-643, saw the flattening in performance of optical photolithographic alignment technology as not persistent and thus, non-existent in the long term. Most of the other studies quoted are not long-term. However, long-term performance improvement rates, defined as the "trend of non-dominated (i.e. record-breaker) performance data points for the overall technology domain (not for individual product generations, individual companies or components)" (Triulzi et al., 2020), are critical for long-term strategy and technology management.

As discussed above, a consistent body of empirical evidence shows that performance improvements for individual technologies follow exponential trends over the long-term, consistent with constant yearly rates of improvement (Moore, 1965; Martino, 1971; Nordhaus, 1996; Moore, 2006; Koh and Magee, 2006; Nordhaus, 2007; Koh and Magee, 2008; Koomey et al., 2011; Nagy et al., 2013; Farmer and Lafond, 2016; Magee et al., 2016). Studies of large sets of such data (Farmer and Lafond, 2016; Magee et al., 2016) agree that random walk around the exponential (constant yearly % increase) is the most appropriate description. Short term segments of these noisy exponentials can be described as S curves but these do not hold up in the long-term as evident in the Farmer and Lafond analysis (2016). Moore's law (1965) is the single most famous example of exponential long-term technology improvement. Thus, the fact that all domains show this exponential behavior is referred to herein as the Generalized Moore's Law (GML).

The performance of many technologies over time $Q_i(t)$ can then be expressed by the following mathematical description given in Equation 1. $Q_i$ represents the intensive performance metric, subscript i denoting technological domain i and subscript 0 denoting time equals to.

$$Q_i(t)=Q_{i0} \exp\{k_i(t-t_0)\} \qquad \text{(Eq. 1)}$$

The exponential factor ($k_i$) in Equation 1 is domain dependent. While different technologies all improve exponentially, they do so at different rates (Koh and Magee, 2008, 2006; Magee et al., 2016). However, $k_i$ is constant (at least to a good approximation) over time in a domain (Farmer and Lafond, 2016) and for different productivity metrics within a domain (Magee et al., 2016).

The characterization of innovation as a combinatoric process of existing ideas (Usher, 1954; Ruttan, V. W., 2000. Technology, Growth, and Development: An Induced Innovation Perspective. Oxford University Press; Fleming, L., 2001. Recombinant Uncertainty in Technological Search. Management Science 47, 117-132; Fleming, L., Sorenson, O., 2001. Technology as a complex adaptive system: evidence from patent data. Research Policy 30, 1019-1039; Frenken and Nuvolari, 2004; Frenken, K., 2006a. A fitness landscape approach to technological complexity, modularity, and vertical disintegration. Structural Change and Economic Dynamics 17, 288-305; Frenken, K., 2006b. Innovation, Evolution and Complexity Theory. Edward Elgar Publishing; Frenken, K., 2006c. Technological innovation and complexity theory. Economics of Innovation and New Technology 15, 137-155; Weisberg, R. W., 2006. Creativity: Understanding innovation in problem solving, science, invention, and the arts, Creativity: Understanding innovation in problem solving, science, invention, and the arts. John Wiley & Sons Inc, Hoboken, N.J., US; Gruber, M., Harhoff, D., Hoisl, K., 2012. Knowledge Recombination Across Technological Boundaries: Scientists vs. Engineers. Management Science 59,837-851; Youn et al., 2015) has been suggested to explain why exponential improvements are observed (Youn et al., 2015; Basnet and Magee, 2016). Furthermore, fundamental properties of a technology domain, such as scaling laws and the complexity of interactions between the components artifacts, have been conjectured to determine differences in rate of performance improvement across domains (Dutton, J. M., Thomas, A., 1984. Treating Progress Functions as a Managerial Opportunity. The Academy of Management Review 9, 235-247; McNerney, J., Farmer, J. D., Redner, S., Trancik, J. E., 2011. Role of design complexity in technology improvement. PNAS 108, 9008-9013; Basnet and Magee, 2016). Thus, while the form of Equation 1 seems to suggest that performance depends only on an exogenous time-trend, it captures improvements due to science, spillover from other technologies, scaling (increase in production) and complexity of interactions (modularity).

A different description for decrease in cost and increase in performance, is based on the observation that cost of many technologies decreases as a power law with cumulative production. The phenomenon is known as an experience curve, learning curve, or Wright's law suggesting learning-by-doing processes as the possible cause (Wright, 1936; Argote, L., Epple, D., 1990. Learning Curves in Manufacturing. Science 247, 920-924). Ayres, R. U., Martinàs, K., 1992. Experience and the life cycle: Some analytic implications. Technovation 12, 465-486, taking a more expansive view, argue that the experience curve is not just related to learning-by-doing but an indirect measure of total effort, including "incremental design improvements, increased capital intensity in the manufacturing process and (closely related) economies of increasing scale." However, experience curves and their conceptualization as examples of learning-by-doing have been subject to criticisms. Nordhaus, W. D., 2014. The Perils of the Learning Model for Modeling Endogenous Technological Change. The Energy Journal 35, 1-13, has shown that there is a fundamental statistical problem in separating learning processes from exogenous technological change during modeling and attributing causality. Sinclair, G., Klepper, S., Cohen, W., 2000. What's Experience Got to Do With It? Sources of Cost Reduction in a Large Specialty Chemicals Producer. Management Science 46, 28-45, as well as Funk, J. L., Magee, C. L., 2015. Rapid improvements with no commercial production: How do the improvements occur? Research Policy 44, 777-788, have shown the important role of R&D which is missed in simple models based on experience curves. Magee et. al (2016) examined the relationship of the number of patents over time with technical performance and found that Moore's Law holds even when the number of patents do not increase exponentially with time. This suggests that Moore's Law is fundamental over the long-term and independent of "effort" variables such as total number of patents.

Past studies have shown that number of patents are significantly correlated with the research "effort" in the domain measured by investment—specifically R&D spending. See Griliches, Z., 1990. Patent Statistics as Economic Indicators: A Survey (Working Paper No. 3301). National Bureau of Economic Research. for an excellent review.

The empirical evidence on Moore's and Wright's law and the apparent difference in interpretation, can be reconciled by the mathematical fact that the two laws are equivalent as long as cumulative production increases exponentially over time (Sahal, 1979; Nagy et al., 2013; Magee et al., 2016). More recently, Lafond, F., Greenwald, D. S., Farmer, J. D., 2020. Can Stimulating Demand Drive Costs Down? World War II as a Natural Experiment (SSRN Scholarly Paper No. ID 3519913). Social Science Research Network, Rochester, N.Y., have shown that growth of experience (measured by cumulative production) and an exogenous time trend (excluding cumulative production) contributed roughly equally to the decreases in cost of military products during World War Two.

Patents Represent the Core Technology Invention and the Classification Overlap Method (COM) Makes Patent Retrieval Repeatable Patents are a set of data that contains the raw information created by the inventors of millions of patents over hundreds of years, and additionally by input from thousands of expert patent examiners whose knowledge is embedded in the organization of this massive data set. Another positive attribute of patents is that they are focused on the activity (invention) that is the mediator of the two other key activities in technological change (pursuit of scientific knowledge and product development). However, many technological progress researchers find the categories defined by the patent examiners "too detailed" and inadequate in representing the reality of the technological enterprise (Larkey, L. S., 1999. A patent search and classification system, in: Proceedings of the Fourth ACM Conference on Digital Libraries. ACM, pp. 179-187; Hall, B. H., Jaffe, A. B., Trajtenberg, M., 2001. The NBER Patent Citation Data File: Lessons, Insights and Methodological Tools (Working Paper No. 8498). National Bureau of Economic Research). This invention may use a decomposition based on technology domains as described below.

The patents corresponding to technological domains defined above can be reliably found using the classification overlap method (COM) described by Benson and Magee (2013, 2015a). COM is an improvement over the traditional keyword search and the classification search and makes patent retrieval repeatable. The usage of two separate hierarchical classification systems by the USPTO (up to mid 2015) allowed distinction between function and knowledge base (the two basic concepts underlying technological domains) to be built into the classification scheme. The resulting success of COM in retrieving patents that are consistent with the artifacts whose performance improvement is measured in the domains is the fundamental reason for expanding the coverage to previously unidentified domains in the current work. Operationally, the normal use of COM first retrieves all patents using a pre-search based set of keywords (in the patent title or abstract or description), companies or individual inventors. The most representative technology classes belonging to both International Patent Classification (IPC) and the United States Patent Classification (UPC), are ranked using an objective score. It is important to note that many patents are classified into multiple classes (Benson and Magee, 2015a; Magee et al., 2016) and so a patent might appear multiple times in each of the most representative technologies. Finally, all patents that have been classified in both the topmost representative IPC class and the topmost UPC class are retrieved for that domain.

In the current invention, this approach may be inverted by examining all possible domains—all possible IPC and UPC class overlaps studying all that have statistically significant numbers of patents. The patents found this way are coherent and in understandable technological areas, allowing us to discern the function, context and evolution of a domain. More importantly, they can also help us arrive at quantitative predictions of technological improvements.

Estimates of the Rate of Performance Improvement can be Made by Using Patent Network Information Centrality of Patents Belonging to a Domain As shown in Benson and Magee (2015b) and, more recently, by Triulzi et al. (2020), once a patent set for a technology domain has been identified, it is possible to estimate the yearly rate of performance improvement for that domain. In these two papers the authors tested several different patent-based measures as predictors of the yearly performance improvement rate for 30 different technologies for which observed performance time series were available. By far, the most accurate and reliable indicator is a measure of the centrality of a technology's patents in the overall US patent citation network, as shown in Triulzi et al. (2020). More precisely, technologies whose patents cite very central patents tend to also have faster improvement rates, possibly as a result of enjoying more spillovers from advances in other technologies and/or because of a wider use of fast improving technologies by other technologies, proxied by patent citations. The measure of patent centrality used is a normalized version of the "Search Path Node Pair" (SPNP) index proposed by Hummon, N. P., Dereian, P., 1989. Connectivity in a citation network: The development of DNA theory. Social Networks 11, 39-63, and operationalized in a fast algorithm by Batagelj, V., 2003. Efficient Algorithms for Citation Network Analysis. arXiv:cs/0309023, for directly acyclical graphs and popularized by, among others, Verspagen (2007) to identify the main paths of technological development in a patent citation network. The SPNP index is a measure of information centrality, conceptually similar to the random-walk betweenness centrality. It measures how often a given node shows up on any path of any length connecting any given pairs of nodes in the network. Therefore, central patents are like information hubs in the citation network, representing inventions that are related technologically by a path of improvements to many other inventions that appeared before and after them.

Triulzi and colleagues, normalized the centrality index by randomizing the citation network under a set of constraints, such as the indegree and outdegree of each patent, the share of citations made by each patent that goes to the same main technology field of the focal patent and the age of the citing-cited pair for each citation.

Similar to what happens for scientific articles, patent writing and citations practices changes over time and across disciplines. This happens because of changes in patenting law and because sometimes, in some discipline it becomes customary to adopt a certain writing or citing practice (such as recurrently citing a given set of patents, to establish patentability of the subject matter). In some areas of technology development, there is also a stronger tendency of applicants to self-cite their previous patents or patents in the same technology subfield than in others. Furthermore, beside these "social biases" in citation practices, there are also some additional distortions that inflate or reduce the probability of being cited a certain number of times or make a certain number of backward citations for a given patent, everything else being equal. For instance, recent patents have less time to accumulate citations than older patents. Similarly, patents in recently emerged domains have less possible citing sources and citable targets than patents in older domains. All these differences make it difficult to compare centrality of different patents and to differentiate the signal of centrality from the effects of other factors, like the age of the patents, the number of citations made and received and the technological class(es) in which it appeared. For this reason, Triulzi et al. (2020) developed a method to separate the signal of centrality from these others confounding factors, by randomizing the overall citation network a thousand times and compute the centrality indicator for each patent in each of the 1000 randomized networks.

The randomization procedure consists in randomly swapping citations between pairs of patents under a series of constraints. Suppose that one observes that, in reality, patent A cites patent B and patent C cites patent D. These two citations are swappable (i.e. A would cite D and C cites B) in the randomized version of the citation network if A has the same grant year of C and B the same grant year of D and if one of the two following conditions apply:

If A and B were assigned by the patent office to the same main technological classification, this classification must be the same of the one in which C and D are assigned If A and B were assigned to different classifications, A must have the same class of C.

These conditions ensure that in each version of the 1000 randomized networks, each patent preserve the same number of citations made and received, the same age profile of its citations made and received and the same share of citations made that go to patents classified in the same class. This automatically ensures that each technology class will have the same number of patents, the same number of citations made and received, the same distribution of citations made and received across different patent ages and the same share of citations falling within class and between classes in each of the 1000 randomized controls and in the observed reality. This allows computing a distribution of the centrality indicator of each patent (and of the average centrality of any given group of patents) across a thousand random but plausible worlds that resemble reality in each key characteristic but the one under study. One can then express the strength of the centrality signal for each patent as a z-score of the observed centrality value given the mean and the standard deviation of this distribution. The z-score may be further normalized in a space from zero to one by taking the rank percentile of the z-score for patents granted in the same year. This, as explained in Triulzi et al. (2020), takes care of another possible source of biases, which is the empirical fact that the range of possible z-scores is a function of the indegree and outdegree of a patent, which in turns is a function of the year in which they are granted. This invention may further compute the average value of the normalized centrality of a patent in a technology domain computed three years after they are granted. This is the predictor that to be plugged in Equation 2 below to calculate the predicted improvement rate.

This approach makes centrality comparable for patents granted in different moments in time and assigned to different technology fields, which, in turn, allows computing a comparable average centrality for patents across technology domains. The latter was shown to have a correlation of 0.8 with the log of the yearly improvement rate. Triulzi et al. (2020) exploited cross-sectional variation and strong stability over time for both yearly improvement rates for 30 domains, for which they had empirical performance time series, and domains' average patent centrality to train a regression able to provide a rather accurate prediction of the empirically observed rates. Through a Monte Carlo cross-validation exercise, they also validated how the goodness of the out-of-sample prediction based on patent centrality does not depend on the set of domains used to test the predicting regression, nor on the time periods used to compute domains' average patent centrality. They did so by, for each year from 1980 to 2013, training a regression using half of the domain and computing the predictor using patent data only up to the given year and testing it on the remaining half. The results showed a very stable coefficient and intercept of the predicting regression and an average correlation of 0.72 with the observed improvement rate after 1990.

BRIEF SUMMARY OF THE INVENTION

This invention builds on the concepts described above but also decomposes the entire patent system into a set of technology domains by extending, inverting and automating COM, calculates rates of improvement for each of the domains belonging to the above set, and provides a new online system for searching technologies and their improvement rates as well as identify some of the key technological domains.

The instant invention makes available technology predictions almost instantaneously. Currently the only way to perform technology predictions is through extrapolation from past performance data. That approach requires painstaking data collection which takes several months and also reasonable technology modeling skills to create models of technology improvement and adoption. Often large corporations hire consultancy companies or fund multi-million-dollar, multi-year projects at universities to accomplish this same work. This takes too much time and manual effort. Often times the decision window passes before the analysis can be completed.

The instant invention may be used by R & D engineers to choose between different technologies while designing new products, R & D managers to prioritize key technologies and predict technology breakthroughs, technology project managers to forecast likelihood of meeting long-term technology development plans, and technology leaders to prioritize technology portfolio development.

For instance, an automotive designer inspecting a prototype of a powertrain system may look at an engine subsystem and might become concerned about the likelihood of meeting emission requirements in the future. The instant invention would enable them to quickly search for and obtain the rate of improvement of the engine subsystem. Based on that information they could determine the likelihood of meeting future requirements given current performance. They might decide to swap the design with a faster improving subsystem (such as fuel cells) because on the current trajectory, the existing subsystem is unlikely to meet future emission requirements.

In one embodiment, the invention comprises systems and methods for calculating a rate of improvement of all technologies, including steps of selecting a United States Patent Classification class and an International Patent Classification class to form a class pair, identifying patents having both the selected United States Patent Classification class and the selected International Patent Classification class, comparing the number of identified patents with a threshold overlap standard, if the number of identified patents is below the threshold overlap standard, discarding the class pair, calculating an average centrality for the class pairs, and obtaining an estimated improvement rate based on the calculated average centrality for the class pairs. In some embodiments, patents common to multiple class pairs are assigned to a largest overlap. In some embodiments, the threshold overlap standard is a randomly expected overlap or a set value. In some embodiments, the invention may further comprise repeating the selecting, identifying, comparing, assigning, calculating, and obtaining actions for all possible class pairs.

In another embodiment, the invention comprises systems and methods for providing a calculated rate of improvement of technology for patented inventions, comprising steps of receiving a search query that comprises one or more technological terms that can each be assigned to one or more pre-determined technological domains of a plurality of pre-determined technological domains for patented inventions, identifying one or more pre-determined technological domains of the plurality of pre-determined technological domains for patented inventions based on each technological term of the one or more technological terms of the search query, determining which of the identified one or more pre-determined technological domains is most relevant to the search query, determining a rate of technological improvement for at least one pre-determined technological domain of the identified one or more pre-determined technological domains that is determined to be most relevant to the search query, and providing the determined rate of technological improvement for the at least one pre-determined technological domain that is determined to be most relevant to the search query. In some embodiments, each pre-determined technological domain of the plurality of pre-determined technological domains comprises patents having a similar technological function using at least one of similar knowledge or similar scientific principles. In some embodiments, the plurality of pre-determined technological domains comprises a substantial majority of patents in a database of patents that includes all United States patents, each patent of the substantial majority of patents being assigned to one or more pre-determined technological domains of the plurality of pre-determined technological domains. In some embodiments, a pre-determined technological domain of the plurality of pre-determined technological domains is based on a designated amount of intersections between International Patent Classifications and United States Patent Classifications.

In some embodiments, the plurality of pre-determined technological domains may comprise at least one of: at least 100 pre-determined technological domains, at least 250 pre-determined technological domains, at least 500 pre-determined technological domains, at least 750 pre-determined technological domains, at least 1000 pre-determined technological domains, at least 1250 pre-determined technological domains, at least 1500 pre-determined technological domains, at least 1700 pre-determined technological domains, at least 1750 pre-determined technological domains, or at least at least 1757 pre-determined technological domains. In some embodiments, determining which of the identified one or more pre-determined technological domains is most relevant to the search query may further comprise using mean-precision recall to perform said determining action. In some embodiments, using mean-precision recall to perform said determining action further comprises using both arithmetic mean and geometric mean to perform said determining action.

In some embodiments, providing the determined rate of technological improvement for the at least one pre-determined technological domain that is determined to be most relevant to the search query, further comprises: providing the determined rate of technological improvement for two or more pre-determined technological domains of the at least one pre-determined technological domain that is determined to be most relevant to the search query and providing one or more additional types of patent-related information for each of the two or more pre-determined technological domains of the at least one pre-determined technological domain that is determined to be most relevant to the search query. In some embodiments, the one or more additional types of patent-related information comprises at least one of: a patent, an assignee, an inventor; or other information that allows one patent to be differentiated from another patent. In

BRIEF DESCRIPTION OF THE SEVERAL VIEWS OF THE DRAWING

FIG. 7 depicts a results overview page in one embodiment of the invention.

FIG. 8 depicts a detailed results page in one embodiment of the invention.

FIG. 9 depicts a feedback section of the detailed results page in one embodiment of the invention.

DETAILED DESCRIPTION OF THE INVENTION

Figure 1:
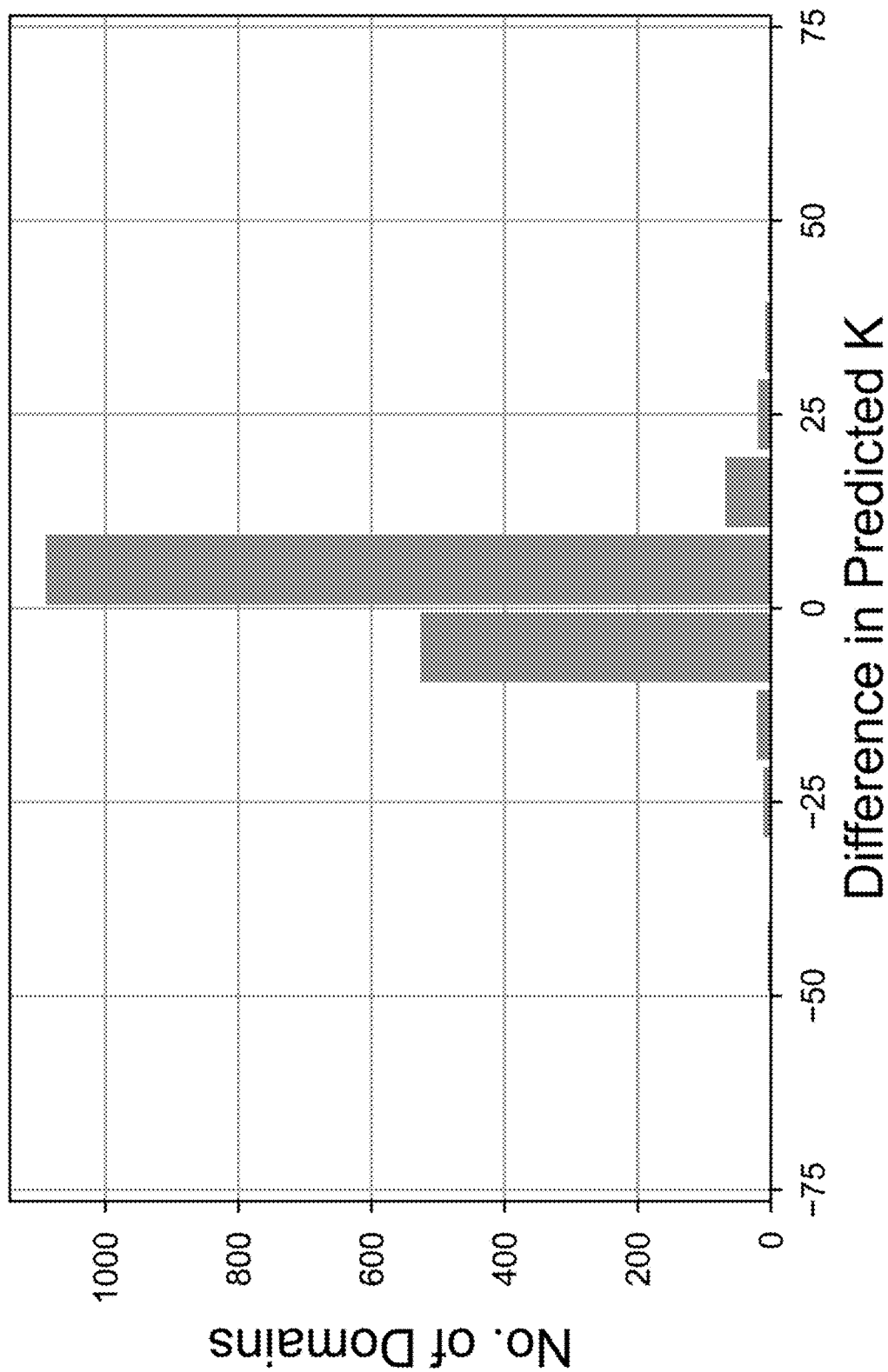
FIG. 1 depicts the distribution of difference in predicted K in % per annum.

The following estimated equation, trained by running a regression for the 30 technologies for which observed improvement rates are available, can be used for out-of-sample predictions of the improvement rate of any given technology domain i for which an accurate patent set can be identified.

$$\text{Estimated } K_i = \exp(6.16 * X_i - 5.02) * \exp(\sigma_i^2/2) \quad \text{(Eq. 2)}$$

In Equation 2, numbers inside the bracket are the estimated coefficients of an OLS regression that has the log of the improvement rate as dependent variable, an intercept and one predictor $X_i$ for each technology domain i. In Triulzi et al. (2020), this predictor is the mean value for all patents in domain i, of the average centrality of the patents cited by each patent j in domain i. The second term in the right-hand side is a correction factor to move back from a log scale to a linear scale.

A dataset for one embodiment of the invention contains all patents issued by USPTO from 1976-2015 for which valid U.S. Patent Classification system (UPC) and International Patent Classification (IPC) current classification data exist. In some embodiments, the invention may be practiced with the current classification data files (i.e., reclassified data and not the data at time of grant) and the list of 3-digit current UPC classes and 4-character IPC classes for the extension of COM.

A suitable dataset, with all patents granted since 1976, may be obtained from the PatentsView platform. PatentsView gets access to the data through an arrangement with the Office of Chief Economist in the US Patent and Trademark Office and is current through Oct. 8, 2019. The dataset contains patent number, date of grant and other metadata. The dataset may be limited to U.S. patents because the performance datasets available to us are overwhelmingly from the U.S. and because the UPC system is desirable for application of COM. U.S. patent data is likely representative of patenting activity worldwide due to its reputation as a technology leader and the vast size of the consumer market enticing most global firms to patent in U.S.

A suitable dataset may include only patents with grant dates between Jan. 1, 1976 to Jun. 1, 2015 totaling 5.7 million. In one embodiment, non-utility (special) classes of patents such as those with the designation "D", "PP", "H", "RE" and "T" summarized in Table 1 may be removed. A very good description of these designations can be found at the USPTO website. This yields a total of 5,083,263 valid unique utility patents. The UPC class "G9B" may be excluded because of its very high similarity to the corresponding IPC class from which it originated, thus, rendering it in unsuitable for COM.

TABLE 1

| Patent Type | Number of Patents |
|---|---|
| D-type | 573,505 |
| PP-type | 25,221 |
| H-type | 2,258 |
| RE-type | 17,955 |
| T-type | 509 |

A suitable dataset may use the complete list of 3-digit current UPC classes (439 in number, obtained from the USPTO website and 4-character IPC classes (648 in number, obtained from the WIPO website for utility patents. The USPTO updates the taxonomy at regular intervals to maintain 'consistency' in classification (in addition to ease of searching) as the meaning of 'consistent' changes over time (Lafond, F., Kim, D., 2017. Long-Run Dynamics of the U.S. Patent Classification System (SSRN Scholarly Paper No. ID 2924387). Social Science Research Network, Rochester, N.Y.). The UPC classes list has not been updated since May 2015. The IPC classes list continues to be updated every year and version 2019.1 is suitable for this invention. The USPTO also reclassifies patents so that, the patents adhere to the latest taxonomy. The reclassification data may be advantageous as the current structure of technology is likely best reflected in the patent classification we have now, instead of the one at the time of grant. This is referred to as current classification in this disclosure. Using classification at time of grant may arrive at a slightly different set of domains (both number and composition). For a historical analysis one could use both the current classification and the classification at time of grants to understand the evolution of structure of technological domains.

UPC current classification data may be obtained from the PatentsView platform. The classification data is based on USPTO bulk data files which were last updated on May 18, 2018. There are 22,880,877 patent records with the current UPC classification data. These contain 5,134,285 unique patents suggesting each patent belongs to 4.46 UPC classes.

IPC current classification data may be obtained from the Google BigQuery platform which uses data from IFI CLAIMS Patent Services. The UPC to IPC concordance was last published in Aug. 20, 2015. As such, no reclassification data for IPC is available after 2015. There are 21,857,265 patent records with International Patent Classification system (IPC) classification data (from 1976 to 2019). These contain 5,920,113 unique patents suggesting each patent belongs to 3.69 IPC classes. As noted above, in one embodiment, all classes in which a patent (both UPC and IPC) is listed (and not just the main class) may be used.

Representative Methodology

Decomposition of the Entire Patent System into a Set of Technology Domains

This invention builds on the concept of domains and the discovery of patents belonging to a particular domain using the classification overlap method (COM) described above and describe the extension, inversion and automation of COM to give a technology domain description for the entire patent system. The invention does not start with a pre-search for a technology of interest as in the usual COM application. Rather, it may start with the set of patents described above as well the lists of UPC and IPC classes. In operation one class from the UPC list and one from the IPC list are selected and all patents which belong to each of those classes are found using the classification data. The invention may then find the "overlap" between these two sets—the patents which lie in both the given IPC class as well as the given UPC class. This may be done for all possible class pairs, i.e. unique combinations of classes—one from IPC and one from UPC and thus define the full set of overlaps. All overlaps are potentially domains but only if a large enough set of patents occupies the overlap.

The disclosed method systematically calculates the overlap for all possible class pairs. Since each class pair is composed of an IPC class and a UPC class, there are 284,472 possible class pairs in total. The overlap as the size of intersection of the set of patents in the selected UPC class and the set of patents in the selected IPC class (i.e. the set of patents listed in both the UPC and IPC class being combined) is obtained. Empirically, most of these overlaps are empty-55% of the overlaps are zeros.

The disclosed method only considers those class pairs as domains which have above random probability of being in an overlap. This is done to avoid misclassification noise. In some embodiments, to deduplicate the patent sets, the disclosed method then assigns patents which lie in more than one overlap to the biggest overlap that they occupy. A final list of domains with each patent matched to only a single domain is thus obtained. In other embodiments patents in multiple domains are counted in each domain as many time times they appear.

To illustrate this methodology, we start with the overlaps between UPC classes 850, 353 171 and IPC classes G01Q, F02B & H02B in Table 2.

TABLE 2

| Class No. | Class Name | Class Size |
|---|---|---|
| 850 | Scanning-probe techniques or apparatus | 3,045 |
| 353 | Optics: image projectors | 9,282 |
| 123 | Internal-combustion engines | 62,113 |
| G01Q | Scanning-probe techniques or apparatus; applications of scanning-probe techniques | 4,748 |
| H02B | Boards, substations, or switching arrangements for the supply or distribution of electric power | 5,147 |
| F02B | Internal-combustion piston engines; combustion engines in general | 35,318 |

This yields a total of nine potential domains as shown in Table 3 where the values in each intersection are the number of patents found in that overlap. For instance, for the class pair 123F02B there are 20,575 patents that are listed both in the 62,113 patent UPC 123 class and the 35,318 patent IPC F02B class.

TABLE 3

| | Class No. | IPC | | |
| | | G01Q | H02B | F02B |
|---|---|---|---|---|
| UPC | 850 | 2,946 | 0 | 0 |
| | 353 | 0 | 2 | 0 |
| | 123 | 0 | 0 | 20,575 |

We only consider those class pairs as domains which have above random probability of being in an overlap to avoid misclassification noise as described above. This eliminates the domain label from class pair 353H02B containing only two patents.

Given the value of P(IPC_x∩UPC_y) and the size of the sample space (total number of patents in our set), we can obtain the expected size of the overlap. For instance, in Table 3, for the class pair 353H02B we calculate:

$$P(UPC\_353) = \text{number of patents in UPC class 353/ Total number of US patents} \quad \text{(Eq. 3)}$$

Thus, P(UPC_353)=9,282/5,083,263=0.0018. Similarly, P(IPC_H02B)=0.001.

The joint probability, $$P(UPC\_353 \cap IPC\_H02B) = P(UPC\_353) \times P(IPC\_H02B) = 1.85 \times 10^{-6} \quad \text{(Eq. 4)}$$

Finally, the expected overlap can be calculated as:

$$\text{Expected overlap} = P(UPC\_353 \cap IPC\_H02B) \times \text{Total number of US patents} \quad \text{(Eq. 5)}$$

The randomly expected overlap comes out to be 9.4. The actual overlap is only 2. Thus, we regard this class pair as not being a domain and do not analyze it further. For efficiency, we also, discard all class pairs which contain less than 100 patents as we believe that is a reasonable threshold for a set of patents to constitute a technology domain with a coherent function and knowledge base. Deduplication empties a number of small overlaps and reduces the number of patents in others. With reference to our illustrative example, this results in 850G01Q and 123F02B as valid domains with sizes 568 and 20,437 (smaller than the original overlaps due to deduplication) as shown in Table 4.

TABLE 4

| | Class No. | IPC | | |
| | | G01Q | H02B | F02B |
|---|---|---|---|---|
| UPC | 850 | 568 | 0 | 0 |
| | 353 | 0 | discard | 0 |
| | 123 | 0 | 0 | 20,437 |

To assess potential mis-classification and/or typos as a source of noise, we calculate the expected probability of patents lying in a overlap given as the product of probability that a patent lies in a given IPC class x-P(IPC_x) and the probability that the patent lies in the given UPC class y-P(UPC_y), if they were independent events. If the UPC and IPC patent classes are unrelated, i.e. the probability of being classified in the given IPC class is independent of being classified in a given UPC class, then the joint probability P(IPC_x∩UPC_y) is in principle the probability of randomly misclassifying due to a typing mistake (typo) or a thinking mistake (thinko). In general, in a domain, the IPC class and the UPC class should be more than randomly related. Therefore, if the overlap is less than that of the patent being randomly classified in both the given UPC class and the IPC class, that overlap may be discarded as it is not an actual domain.

The probability of any joint event A and B i.e. P(A∩B) equals the product of probability of event A i.e. P(A) and probability of event B i.e. P(B) if the two events are completely independent:

$$P(A \cap B) = P(A) \cdot P(B) \quad \text{(Eq. 6)}$$

Given the value of P(IPC_x∩UPC_y) and the size of the sample space (total number of patents in our set), we can obtain the expected size of the overlap.

$$\text{Expected overlap} = P(\text{IPC}\_x \cap \text{UPC}\_y) \times \text{Total number of US patents} \quad \text{(Eq. 7)}$$

If the actual overlap come out to be less than the randomly expected overlap comes, that class pair may be regarded as not being a domain and not analyzed further. All class pairs with actual overlap less than randomly expected may be discarded to indicate that the overlap could occur because of noise due to miswritten class numbers or other semi-random noise.

Empirically for the dataset described above, we lose 23,711 patents accounting for 0.47% of total patents and finally, obtain a set of valid "domains". For efficiency, we may also discard all class pairs which contain less than 100 patents as we believe that is a reasonable threshold for a set of patents to constitute a technology domain with a coherent function and knowledge base.

Since some patents lie in multiple UPC and multiple IPC classes (as discussed above), some patents naturally lie in more than overlap. For simplicity and ease, they may be assigned to the largest overlap so that the final decomposition lists each patent in only one domain. For the purposes of technology improvement rate this does not make a big enough difference to concern us as this work is focused on rate of improvement.

To verify that proposition, the distribution of the difference and percentage difference between predicted rates of improvement (predicted K) from original dataset and deduplicated dataset may be examined. The predicted rates of improvement (predicted K) are reported as percentage change per annum. Table 5 contains summary statistics for predicted rates of improvement (predicted K in % per annum) from an original dataset and a deduplicated dataset.

TABLE 5

|      | Original Dataset Predicted K (O) | Deduplicated Dataset Predicted (K) (D) | Difference in K-Value (O − D) |
|------|------|------|------|
| MEAN | 20 | 19 | 0 |
| STD  | 28 | 26 | 7 |

TABLE 5-continued

|      | Original Dataset Predicted K (O) | Deduplicated Dataset Predicted (K) (D) | Difference in K-Value (O − D) |
|------|------|------|------|
| MIN  | 3 | 2 | −63 |
| MAX  | 226 | 230 | 77 |

As seen in Table 5, the mean of both the percentage difference and the difference are quite small indeed. The mean of difference is 0 percentage points with a standard deviation of 7 which is quite small, suggesting that almost all difference values lie close to 0. This can also be seen clearly in the plot of the distribution of difference in FIG. 1.

Figure 2:
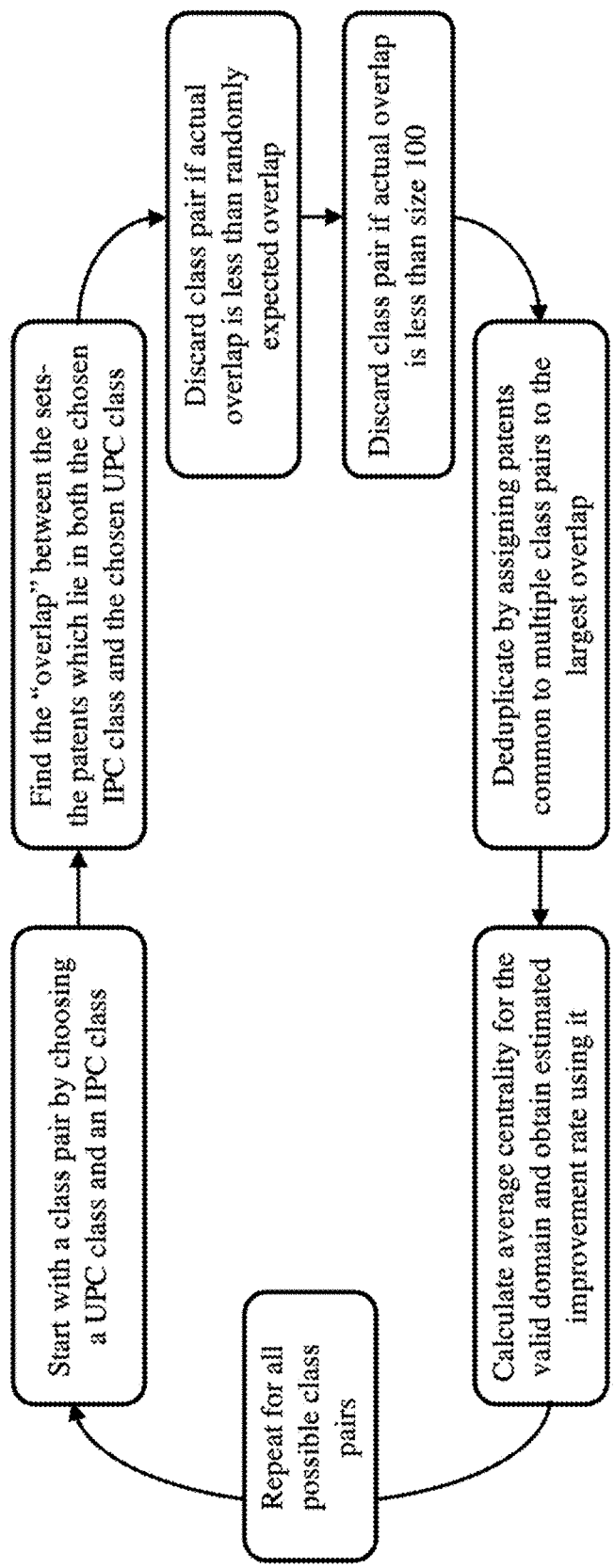
FIG. 2 is a flow diagram depicting the process steps for inverted COM.

In research on technological structure, the duplicated lists would be used as well. Deduplication empties a number of small overlaps and reduces the number of patents in others. Going forward, by size this disclosure refers to the number of unique patents after deduplication. FIG. 2 shows a graphical summary of the methodology and the key steps described above.

Recall that for the dataset described there are 283,824 (438×648) potential domains having a unique UPC and IPC classification and 5,083,263 utility patents in our set that have appropriate UPC and IPC designations. 66.3% i.e. two-thirds of these patents are contained in the largest 175 domains which are only 0.06% of the possible domains showing that technologies are selectively in a relatively narrow set of domains. Indeed, 13,142 overlaps (i.e. 4.62% of class pairs) contain 99.52% of all patents. Recall that before deduplication, only 55% of the possible domains contained zero patents. Indeed, the overall concentration is stronger after deduplication. The details in Table 6 illustrate two inter-related key results for the exemplary dataset. First, most of the domains are small domains (86.6% of domains contain less than 100 patents each) and secondly that despite the large number of small domains, most patents are in larger domains (almost 90% of the patents are in domains that have at least 1,000 patents).

TABLE 6

| Size of Domain | Number of domains of that size | Number of domains of that size as a fraction of total possible | Total number of unique patents in all domains of that size | Fraction of unique patents in all domains of that size |
|---|---|---|---|---|
| 1-9 | 8400 | 0.0296 | 23864 | 0.0047 |
| 10-99 | 2985 | 0.0105 | 94163 | 0.0185 |
| 100-999 | 1153 | 0.0041 | 390087 | 0.0767 |
| 1000-9999 | 490 | 0.0017 | 1685323 | 0.3315 |
| Above 10000 | 114 | 0.0004 | 2865248 | 0.5637 |

The domains considered may be confined to those containing greater than or equal to 100 patents. As can be found by adding the last three entries in Table 6, this yields 1,757 domains and 97.2% of the patent system.

Calculation of Rates of Improvement for the Set of Domains

As explained above, the disclosed method uses the method defined in Triulzi et al. (2020) to predict the improvement rate for each identified technology domain. However, the instant disclosure departs from that paper, among other ways, in the choice of which centrality measure to use. In Triulzi et al. (2020), the authors propose using the average normalized centrality of the patents cited by a domain's patents as a predictor of the domain's improvement rate. This is done because using data on the focal patents' centrality would require waiting an arbitrary number of years after the patent is granted to allow the patent time to accumulate citations, which is necessary to measure its centrality reliably. Since a focal patent's centrality and the centrality of the patent it cites are strongly correlated and given that in Triulzi et al. (2020) some of the domains studied were very recent, in that paper the authors preferred to use the centrality of the cited patents to avoid losing data for the young domains. However, in the instant method, a very large sample of domains may be analyzed, most of which are fairly old. Therefore, the normalized centrality of the focal patents in a domain computed after three years from the moment the patent is granted is preferred, given its stronger appeal in terms of ease of computation and presentation of the measure.

The proposition that the change in predictor has no significant effects on the result of the prediction may be verified, which is expected since the correlation between the normalized centrality of patents after three years and the normalized cited patents' centrality is 0.97 at the 1,757 domains' level (it is 0.77 at the patent level).

Table 7 below compares a few indicators of the goodness of the prediction between model 1 in Table 3 of Triulzi et al. (2020), which reports the regression results for the normalized centrality of cited patents, and the same model using the normalized patent centrality after three years.

TABLE 7

|  | Model using the normalized centrality of the cited patents | Model using the normalized patent centrality after three years |
|---|---|---|
| $R^2$ | 0.63 | 0.62 |
| Sum of squared residuals | 10.23 | 10.68 |
| Standard error of the regression | 0.16 | 0.16 |

One may then examine the distribution of the difference and percentage difference between predicted rates of improvement (predicted K) from original predictor (average centrality of patents cited by a domain's patents) and the modified predictor (centrality of the focal patents in a domain after three years from the moment the patent is granted). The predicted rates of improvement (predicted K) are reported as percentage change per annum.

TABLE 8

|  | Triulzi et al. (2020) predicted K (T) | This disclosure predicted K (S) | Difference in K-Value (T − S) |
|---|---|---|---|
| MEAN | 18 | 19 | −1 |
| STD | 27 | 26 | 6 |
| MIN | 2 | 2 | −63 |
| MAX | 262 | 230 | 122 |

Figure 3:
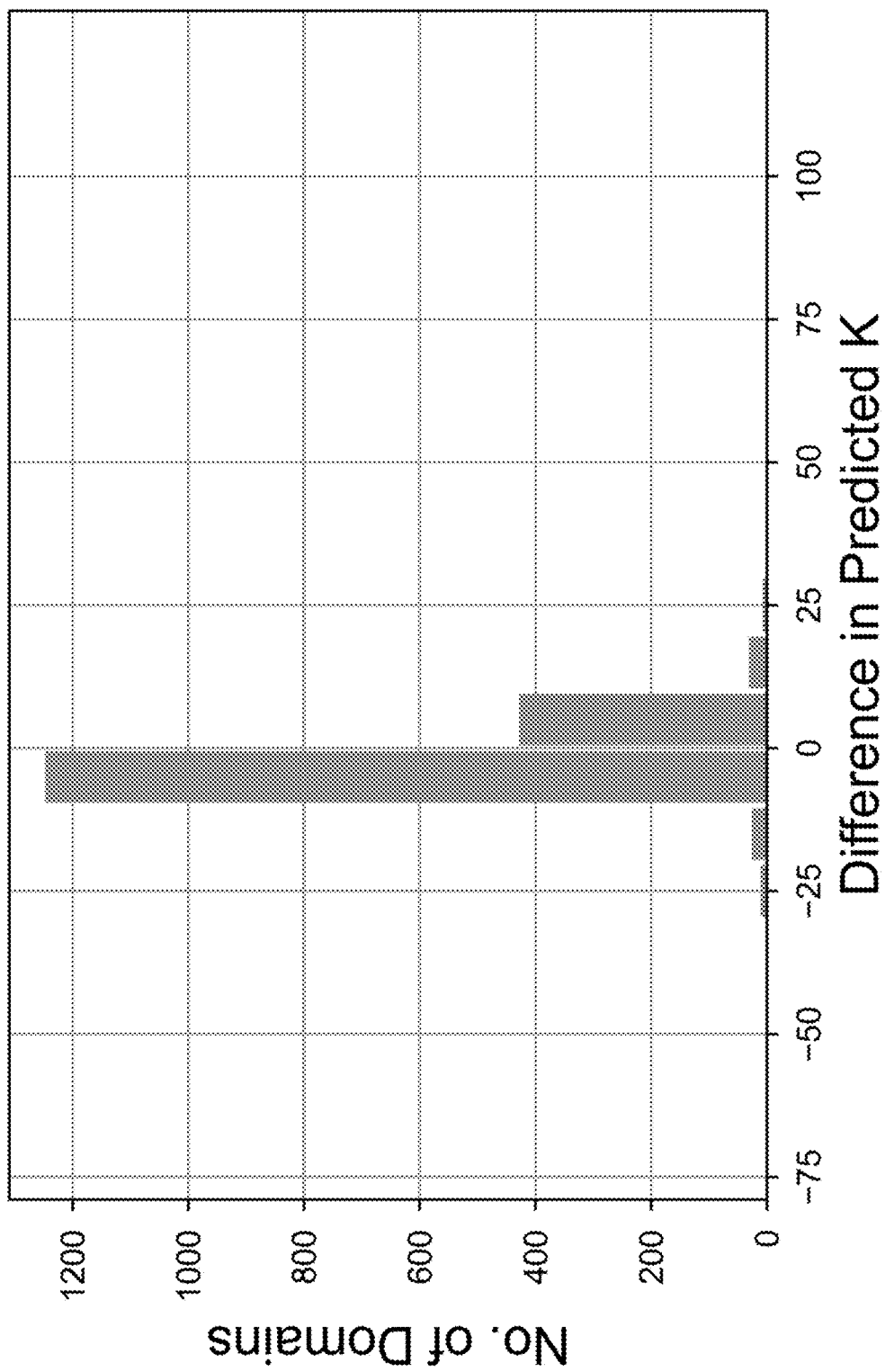
FIG. 3 depicts a distribution of difference in predicted K in % per annum for both predictors.

As seen in Table 8, the difference in K-values have a mean of −1% per annum (p.a.) and standard deviation of 6% p.a., showing for most domains predicted Ks' are almost identical. This can also be seen clearly in the plot of the distribution of difference in FIG. 3.

For prediction, the disclosed method may use the following equation, adapted from Triulzi et al. (2020).

$$\text{Estimated } K_i = \exp(6.22 * X_i - 4.97) * \exp\left(\frac{\sigma_i^2}{2}\right) \qquad \text{(Eq. 8)}$$

The coefficients have been obtained by training an OLS regression of the log of the observed improvement rate for 30 technologies (for which empirical time series of performance over time were available) against the average normalized centrality of their patents measured three years after being granted ($X_i$ in the equation). The improvement rates for these 30 technologies and their patent sets with centrality values may be the same used in Triulzi et al. (2020).

For each of the 5,083,263 utility patents granted by the USPTO between 1976 and 2015, the normalized centrality index may be computed using the same citation network randomization procedure presented in Triulzi et al. (2020) and explained briefly above. The average centrality of patents in each of the 1,757 identified technology domains may then be computed and plugged into the equation to obtain the predicted yearly performance improvement rate.

It is important to note that the normalization of the centrality measure for each patent granted by the USPTO, produced an indicator that is uniformly distributed between 0 and 1. Therefore, if patent sets for the technology domains are sampled randomly from the overall set and then the average normalized patent centrality for each technology domain is calculated, its distribution would follow a normal distribution with mean equal to 0.5. If that were to be true, the distribution of the predicted improvement rate could not be interpreted as it would just be an artifact of random sampling patents and of the centrality normalization method. This is not the case as all normality tests for the distribution of mean centrality across domains reject the normality hypothesis. In fact, the best fit for this distribution is an exponentially modified Gaussian (the sum of an exponential random variable and a Gaussian one).

Figure 4:
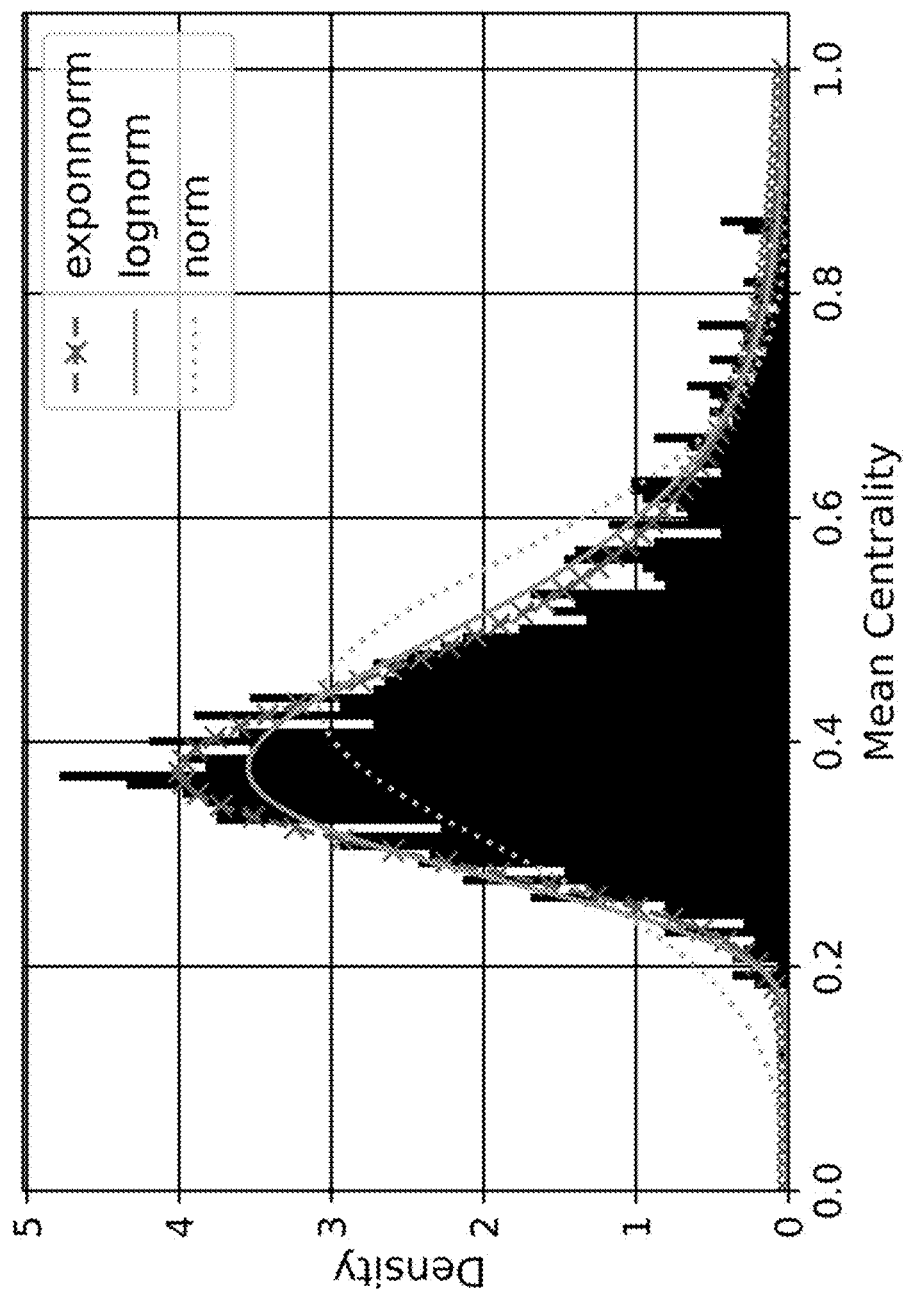
FIG. 4 depicts fitting the distribution of mean centrality across the 1,757 domains.

A series of normality tests may be performed to examine the possibility that the distribution of centrality across domains could reflect a random sampling of patents from the overall population. FIG. 4 shows the distribution of the mean centrality (calculated three years after the patent is granted) for all 1,757 technology domains. The distribution is overlaid by the best fitted probability density function (an exponentially modified Gaussian distribution, with the rate, location and scale parameters respectively 1/2.057, 0.313 and 0.0586) and two comparison distribution, the Gaussian and the log-normal one. The parameters have been obtained by fitting the distribution with the package Fitter in Python. The sum of the squared errors for these three distributions is 7.67 (with an AIC of 120.6 and BIC of −9524.8) for the exponentially modified Gaussian, 11.88 (with an AIC of 147.6 and BIC of −8755.17) for the lognormal and 41.36 (with an AIC of 106.7 and BIC of −6571.9) for the Gaussian. This clearly shows that the distribution is not normal, nor is log-normal.

A series of normality tests may also be performed, as reported in Table 9, which unequivocally reject normality.

TABLE 9

| Test | Statistic | P-value |
|---|---|---|
| Shapiro-Wilk | 0.937 | 0.000 |
| D'Agostino's Chi-squared | 240.553 | 0.000 |
| Anderson-Darling | 32.758 | 0.000 |
| Kolmogorov Smirnov | 240.553 | 0.000 |

This methodological result, along with the test for randomly expected overlap, further strengthens the proposition that the method disclosed herein is revealing an underlying property of technology system concerning the distribution of the improvement rates and patent centrality across domains.

Online Technology Search and Identification of Domain Technology

The process presented provides a broad and systematic account of technological change. However, improvement rates for specific technologies (or domains) or groups of related technologies are also of potential interest to many engineers, product designers, researchers, technology project managers, R&D managers and policy makers. Thus, we have developed an online technology search system which enables a user to find predicted improvement rates for a technology of interest. For each given search term, we return the top 5 most representative domains along with a prediction of the improvement rate for each domain as well as the title and abstract of the most central 20 patents from the most representative domain. The user is then able to judge whether to try different key words if the example patents indicate something different than what they intended to examine or want to pursue interesting leads from reading the patents they discover in the first round. The search tool can be accessed through a user-friendly interface and is hosted on a cloud server.

For a user trying to find domains, we have developed an online technology search system which enables a user to find predicted improvement rates for a technology of interest. For each given search term, we search patent title, abstracts and (optionally) description across the entire dataset of valid US utility patents (with grant dates between Jan. 1, 1976 to Jun. 1, 2015) and return the list of patent numbers containing the term. This is accomplished by using full text search functionality in a relational database (such as MySQL, PostgreSQL etc.). The standard text search function incorporates tokenization, stemming and vectorization to enhance the search. We then match this list of patents to our corresponding domains by using the correspondence established before. We find the most representative domain for those patents by using a relevance ranking. The relevance ranking for the patent classes is accomplished by using the mean-precision-recall (MPR) value proposed by Benson and Magee (2013). This value was inspired by the 'F1' score that is common in information retrieval but uses the arithmetic mean (instead of the geometric mean) of the precision and recall of a returned data set (Magdy, W., Jones, G. J. F., 2010. PRES: a score metric for evaluating recall-oriented information retrieval applications, in: Proceedings of the 33rd International ACM SIGIR Conference on Research and Development in Information Retrieval, SIGIR '10. Association for Computing Machinery, Geneva, Switzerland, pp. 611-618). We return the top 5 most representative domains along with a prediction of the improvement rate for each domain as well as the title and abstract of the top 20 and a random set of 20 patents from the most representative domain.

The user is then able to judge whether to try different key words if the example patents indicate something different than what they intended to examine or want to pursue interesting leads from reading the patents they discover in the first round. The search tool can be accessed by the readers from the project website through a user-friendly interface and is hosted on a cloud server.

Other Considerations

This disclosure and invention represent the first attempt at a complete yet granular survey of technological performance improvement rate across the entire spectrum of technology. Methods to survey predicted improvement rates as disclosed, the online technology search system and the analysis of the distribution of improvement rates across all technologies domains have important managerial and policy implications, especially for allocation of resources among competing priorities.

There are also other aspects and embodiments within the scope of this invention. First, we have not determined every improvement rate of possible interest: the domains with less than 100 patents (~10,000 domains) may contain some important emerging technologies; we have not even attempted to name all 1,757 domains that we separately predicted rates of improvement for; perhaps most importantly prior work using COM (Benson, C. L., Magee, C. L., 2016. Using Enhanced Patent Data for Future-Oriented Technology Analysis, in: Daim, T. U., Chiavetta, D., Porter, A. L., Saritas, O. (Eds.), Anticipating Future Innovation Pathways Through Large Data Analysis, Innovation, Technology, and Knowledge Management. Springer International Publishing, Cham, pp. 119-131; Guo, X., Park, H., Magee, C. L., 2016. Decomposition and Analysis of Technological domains for better understanding of Technological Structure. arXiv:1604.06053 [cs]; Benson, C. L., Triulzi, G., Magee, C. L., 2018. Is There a Moore's Law for 3D Printing? 3D Printing and Additive Manufacturing 5, 53-62; You, D., Park, H., 2018. Developmental Trajectories in Electrical Steel Technology Using Patent Information. Sustainability 10, 2728) has often found specific technologies to be more closely identified at deeper sub-groups within the UPC and IPC classes than the high-level classes we applied systematically in this work. As shown in the identification work, we have done, the higher level we used leads to coherent domains and recognizable technologies but the inventive method could pursue deeper level sub-domains. A second alternative implementation uses a different method to eliminate doubly (or triply etc.) listed patents where all duplicate patents were assigned to only the largest domain in which they are found. Another approach is to start by combining domains with high overlaps and use the remaining overlaps to give a measure of interactive structure.

Technology Search System and Hardware Implementation

Since each class pair in the representative dataset is composed of an IPC class and a UPC class, there are 284,472 possible class pairs in total. There are also 5,083, 263 patents in the set. As such, powerful computing machines with multiple CPUs and large random-access memories are required to calculate overlaps of all possible pairs, test whether the overlap is above randomly expected overlap and to optionally assign the overlap to the larger domain because these processes require large amount of processing power and working memory. In actual practice, this is often accomplished by using high performance computing clusters rather than personal computers.

Another implementation is to parallelize the computation using GPU machines. These require vectorization of the calculation to treat the data sources as large arrays of classification data for each patent. In the vectorized version, the system needs to have a larger amount of working memory because these large arrays of classification data need to be merged within the working memory. Once the arrays are merged, one would merely need to group the data by merged IPC and UPC designations to get the list of patents belonging to each pair. One would then test each non-zero pair for whether it is above non-zero overlap or not.

The list of domains and the patents belonging to them may be used to run OLS regression. Again, a computing equipment with enough computation power and working memory to be able to find the mean of centrality values of the patents belonging to each domain for the prediction is required.

Once the list of all domains and their rates of improvements are found, one must implement the search system for the user. Since the motivation for the invention is to help policymakers make better decisions, it is important to make information available in a user-friendly manner. Due to the wide variety of technologies likely to be of interest to the various stakeholders as well as the success of the search paradigm for information retrieval, a technology search system was developed as the most suitable framework for presenting information to users to integrate into their decision-making workflow.

The inventive system may show an introduction and instructions and then may accept a query from a user, which may including multiple strings. Preferably, the system is capable of searching a very big database (4 GB) for matching entries under one second. The system may perform calculations using results from the search and a smaller database (less than 1 mb). In one embodiment, the system outputs a table with about file entries based on results from a calculation step. In a preferred embodiment, each entry in the table shall be clickable and shall lead to detailed results with another table containing about 20 entries from a different database (less than 10 mb). The tables are preferably scrollable.

In one embodiment the system comprises a custom dynamic web-application capable of search and calculations. A static website is generally much easier to do but limited in functionality and the range of capabilities it makes available to the user. Python has become one of the most commonly used software programming languages. As such, to ensure future maintainability, adequate support and availability of technical expertise, a python-based web-framework is one suitable possibility for the web search system.

There are two major python-based web-frameworks-Flask and Django. Due to the requirement of dealing with a large database and Django's suitability for dealing with search and cloud deployment, Django may be selected in a preferred embodiment. In Django, there is a clear separation in Django between the client-side and the server-side. The client-side primarily consists of the user interface. These are implemented using Django templates which are written in HTML and/or CSS and are not much different from conventional website design. The server-side consists of data management as well as the operations on the data while meeting user-queries. The key functional elements on the server side are the "model" and the "view", in addition to the database which is independent of the framework. Taken together, this represents a client-server architecture with model-view-template. These are explained in more detail in the following sections.

Figure 5:
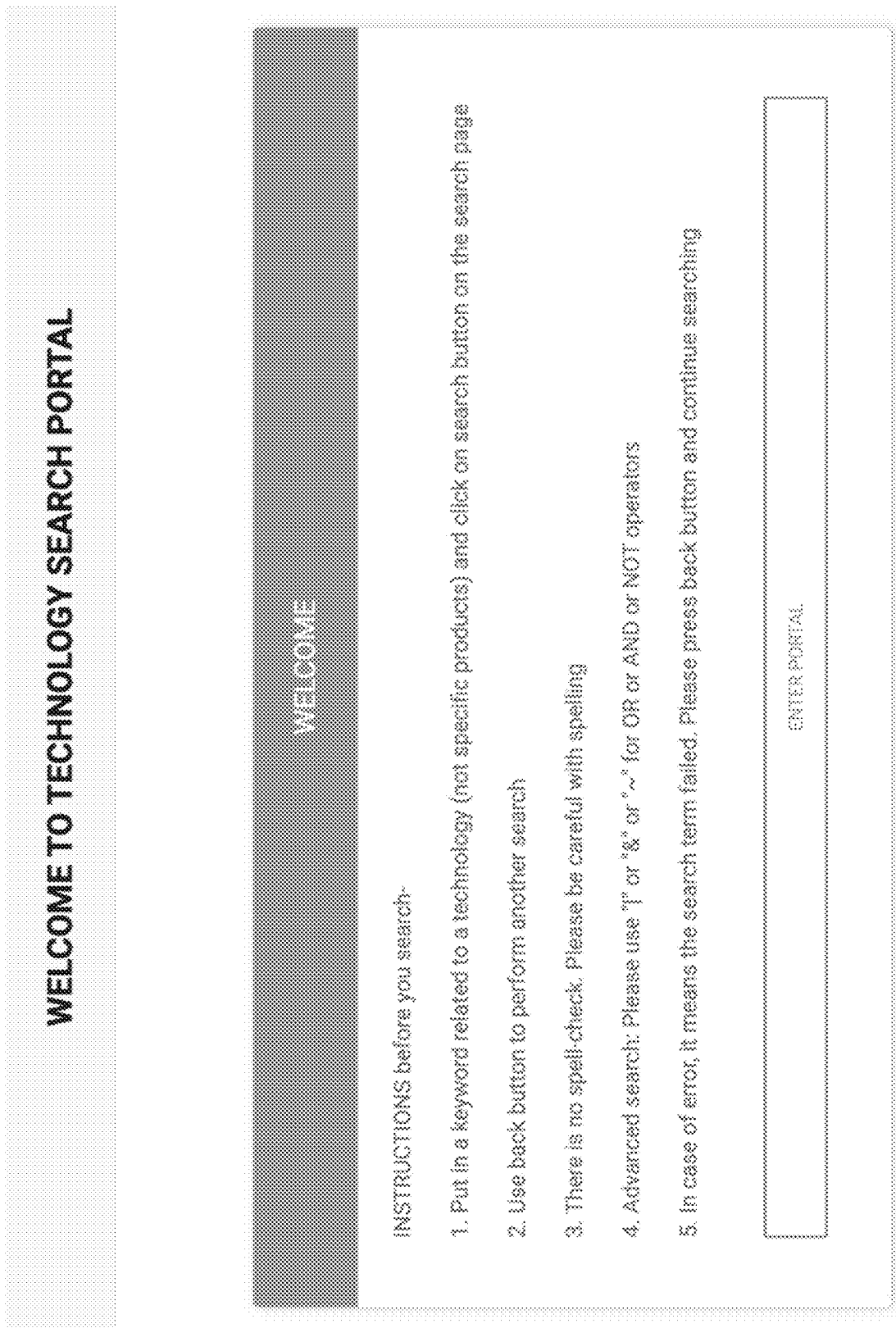
FIG. 5 depicts a welcome page in one embodiment of the invention.
Figure 6:
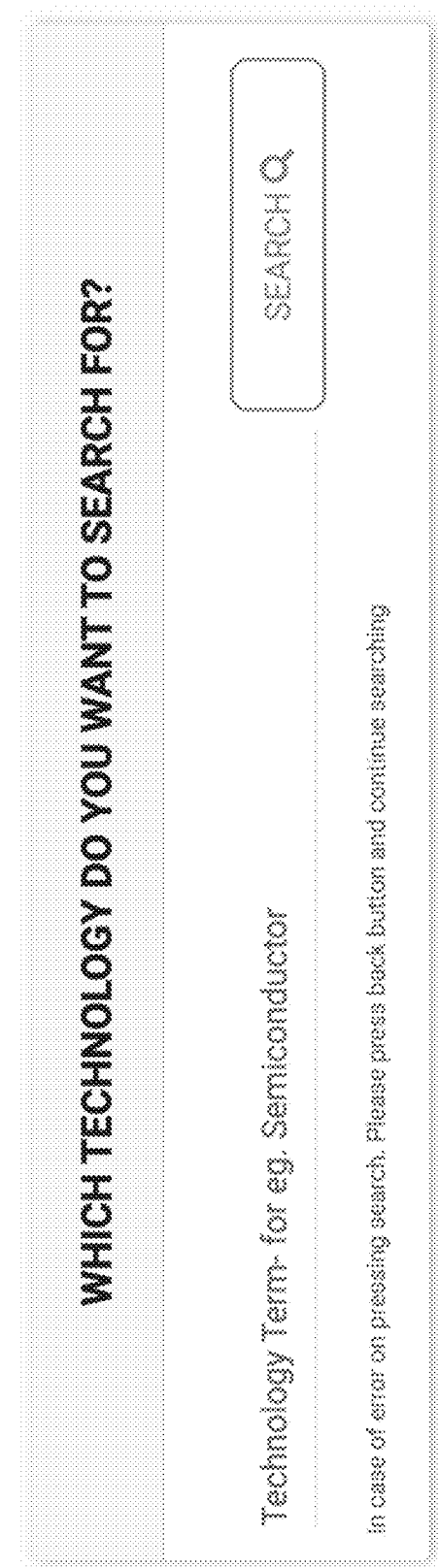
FIG. 6 depicts a search page in one embodiment of the invention.

A user interface comprises a graphical use interface on the client side of the web framework. Since the invention is a new kind of tool, some instructions and hand-holding may be necessary for new users. As a user grows familiar with the interface and the capabilities of the tool, the instructions may go away. FIG. 5 shows one embodiment of the instruction interface. In one embodiment, entering the portal takes the user to the search page. In one embodiment, the search page is minimal, distraction free and focuses on the search box as well as the search button. In order to help a new user, the search box may incorporate a technology term prompt as shown in FIG. 6.

FIG. 7 shows one embodiment of a results overview section. A results overview section may be primarily composed of a table summarizing the improvement rate of the top five matching technological domains. In one embodiment, a table lists the following key pieces of information for each technology domain:

Domain ID is a unique identifier for each technology domain and also the portmanteau of the parent UPC class and the parent IPC subclass of the domain. Clicking on the Domain ID takes the reader to the Top 20 patents for each domain, allowing them to qualitatively assess the quality of match.

Estimated Improvement Rate (p.a) is the annual improvement rate of the technological domain in percent. To help the user interpret the results it its noted that a rate above 42% means the technology is improving faster than integrated chips, made famous by Moore's law (1965).

Domain size is the number of patents in the technology and Patents Matched is the number of patents which contain the keyword you searched for.

MPR is a quantitative measure of relevance as described above.

FIG. 8 shows one embodiment of a detailed results page with the top 20 patents from domain 60F02B. Clicking on a Domain ID may take the user to the top 20 patents from each domain. In one possible embodiment, the detailed results could be displayed within the results overview section, but that approach might overload the results page with information and create too much cognitive overhead for a user. In a preferred embodiment, results are hidden away and linked to the main table using the Domain ID. In one embodiment, patents are ranked by their average centrality using the centrality measure described above. For each patent, the patent number, title, abstract and the name of the assignee may be provided.

FIG. 9 shows a feedback section. A feedback section may follow the overview section in the results page to be accessed by scrolling down. A key goal of the feedback section is to leverage the advantages of an online system by improving the system with user feedback. By accepting feedback, a deeper connection between popular technology terminology and the 1,757 domains can be developed. In one embodiment, the feedback section is minimal with two questions assessing accuracy and preciseness, two blanks with prompt for user input and legend for calibrating the score.

The system may also comprise a backend implementation. Backend functions may be implemented with a web-framework (such as Flask or JavaScript plus NodeJS) using a similar architecture (client-server with model-view-template) or with a completely different architecture (such as a serverless architecture).

In one embodiment of database and full text search implementation, the patent title and abstract are combined into a single text field and stored along with the patent number and the corresponding domain ID. The choice of database is independent of the web framework used and Django is flexible enough to deal with different kinds of databases. However, the size of the database (~4 GB) and requirement of fast search required considerable optimization for full text search implementation.

For each given search term, the backend solution may search patent title and abstracts across the entire dataset of valid US utility patents (with grant dates between Jan. 1, 1976 to Jun. 1, 2015) and return the list of patent numbers containing the term. To search a database of that size would require up to 300 seconds on a PC of normal configuration (dual core processor with enough RAM). A waiting period this long, could be a serious impediment to user experience and would impair the interactive nature of the tool.

In a preferred embodiment, an inverted index on a relational database, such as Generalized Inverted Index on PostgreSQL (a relational database like MySQL etc.), may be used. The idea behind using an index in this embodiment is the same as an index for a book. Indexing also incorporates tokenization, stemming and vectorization to cut down on the total number of words the system will have to look-up. This approach necessitates an increase in the size of the database as it has to store the database along with the index. However, since storage tends to be cheaper than processing power at the current time, this may be a tradeoff worth making. In this embodiment, the worst-case search time may be cut down to less than 2-3 seconds for large queries on the same configuration. For most queries in this embodiment, the search is instantaneous. By using a slightly larger configuration, the online system loads results faster than a Google search (although Google looks up a much-much larger index and is providing much a greater diversity of results). This embodiment is typically able to load results under 250 milliseconds and under 300 milliseconds for the largest queries, which is consistently faster than most Google queries in testing (measured using Chrome DevTools).

In one embodiment, the system uses the full text-search described above and makes calculations on the results returned by the database. These calculations may be made within a Django "view", an abstraction consisting of Python code which interacts with the database through the abstraction of a "model" and returns graphical objects which can be rendered by the "template". A model is a data-object with certain attributes. For instance, each separate patent may be described by a model which contains patent number, combined text of title and abstract as well as the corresponding domain. In one embodiment, the "view" accepts a user query, formats it and sends it to the database. The results from the database are then processed using simple algorithms written in Python code. The list of patents retrieved are grouped by their corresponding technology domains by using the correspondence established before. The most representative domain for those patents is found by using a relevance ranking. The relevance ranking for the patent classes is accomplished by using the mean-precision-recall (MPR) value proposed by Benson and Magee (2013). This value was inspired by the 'F1' score that is common in information retrieval but uses the arithmetic mean (instead of the geometric mean) of the precision and recall of a returned data set (Magdy and Jones, 2010). Finally, the "view" returns the top 5 most representative domains along with an estimate of the improvement rate for each domain as an HTTP object to the user side and the table is displayed using the "template". The view also returns the title and abstract of the top 20 patents from the most representative domains.

To ensure reliable performance, uninterrupted service and effectiveness of cost, the system may be deployed to an on-demand cloud computing platform such as Amazon Web Services (AWS). The advantages of AWS include ease of deployment and availability of detailed documentation as well as support in popular forums. AWS also works well with Django and automatically sets up a computing instance, a storage instance and security protocols for the web application. However, in this embodiment, the database needs to be setup separately and needs to communicate with the computing instance.

The search system may be implemented as a standalone program on a user's computer. This approach will require large amounts of memory to hold the entire patent corpus and computation power to perform the calculations for match quality. The user may be informed that the results are ready with a graphic prompt (including an animation) or an audio prompt using a speaker system.

Another method is to implement the search system on a remote machine or a remote server such as those provided by a cloud computing provider. The remote server may further hold the entire corpus in its working memory or implement a relational database (such as PostgreSQL) with inverted index on the remote machine.

In such a case the user may connect to the server through a dedicated application or a web browser on the user computer or any interactive device with input and output functions to provide the search query over the internet. The calculations will be performed on the remote server and only the results of the calculation will be returned to the user.

The user may be informed that the results are ready with a graphic prompt (including an animation) or an audio prompt using a speaker system. The user may also choose to provide their query using a microphone and the voice query will converted to a search term by using any commercially available natural language processing system. The results may also be provided to the user through an audio medium by a commercially available text to speech system.

A dedicated application or the browser interface may also be implemented on other specialized hardware such as collaboration screens or large interactive displays. This would allow teams of engineers and planners to quickly and iteratively search for alternative technological options for their products or project plans and ultimately build consensus.

Another potential embodiment is on mobile devices or smartphones to send user queries and receive results of the technology search system. Another embodiment is that of augmented reality goggles. These will particularly rely on audio-visual methods as the user might be working with an existing prototype and may wish to search for a technological alternative when the current option is not likely to meet future specification and requirements. For instance, an automotive designer inspecting a prototype of a powertrain system may look at engine subsystem and might become concerned about the likelihood of meeting emission requirements. They could quickly search for and obtain the rate of improvement of the engine subsystem. Based on that they can determine the likelihood of meeting future requirements given current performance. They may decide to swap it with a faster improving subsystem (such as fuel cells) because it is likely to fail emission requirement. As such, they could quickly provide an audio search query and receive audible results while looking at the physical system.

One skilled in the art will appreciate further features and advantages of the disclosures based on the provided for descriptions and embodiments. For example, the inventive methods and systems disclosed herein may be used with other datasets having similar attributes and relationships to the exemplary dataset. Accordingly, the inventions are not to be limited by what has been particularly shown and described. All publications and references cited herein are expressly incorporated herein by reference in their entirety.

What is claimed is:

1. A method for forecasting a rate of improvement of discrete technology domains by combining a predictive model and technology model, comprising:
creating a technology model that reflects a plurality of technology domains, by
selecting a plurality of United States Patent Classification classes and a plurality of International Patent Classification classes to form a plurality of class pairs, each of which reflects a potential technology domain;

for each class pair in the plurality of class pairs:

querying a database of patents to identify patents lying in both the selected United States Patent Classification class and the selected International Patent Classification class;

determining a threshold overlap standard based on an expected number of patents lying in both the selected United States Patent Classification class and the selected International Patent Classification class by calculating a joint probability of any single patent appearing in both the selected United States Patent Classification class and the selected International Patent Classification class if the pair was selected at random and was technologically unrelated and multiplying said probability by the total number of patents in the patent system to obtain an expected number of patents in any randomly selected unrelated class pair;

comparing the number of said identified patents in the class pair with the threshold overlap standard, and if the number of said identified patents in the class pair is below the threshold overlap standard, determining that the class pair is unlikely to encompass a meaningful technology domain and discarding the class pair, if the number of said identified patents in the class pair is equal to or below the threshold overlap standard, determining that the class pair is likely to encompass a meaningful technology domain and retaining the class pair;

updating the technology model, by calculating and storing, for each class pair, an average patent centrality value for the said identified patents within each class pair by analyzing a graph representation of said identified patents with a normalized search path node pair index and training a prediction model for the rate of improvement of technology domains; and applying the prediction model to obtain an estimated improvement rate based on said calculated average centrality value for each of the class pairs.

2. The method of claim 1, wherein the step of querying a database of patents to identify identifying patents having both the selected United States Patent Classification class and the selected International Patent Classification class further comprises assigning patents common to multiple class pairs to the class pair comprising the largest overlap.

3. The method of claim 1, wherein the step of querying a database of patents to identify identifying patents having both the selected United States Patent Classification class and the selected International Patent Classification class further comprises assigning patents common to multiple class pairs to each of said multiple class pairs.

4. The method of claim 1, wherein the average patent centrality value is computed as of a date occurring after each patent was granted.

5. The method of claim 4, wherein the average patent centrality value is computed as of three years after each patent was granted.

6. The method of claim 1, wherein the technology model includes all possible combinations of each United States Patent Classification class with each International Patent Classification class.

7. The method of claim 1, wherein each United States Patent Classification class in the plurality of United States Patent Classification classes represents a classification based on the functional purpose of a plurality of patents.

8. The method of claim 1, wherein each International Patent Classification class in the plurality of International Patent Classification classes represents a classification based on the body of fundamental scientific knowledge addressed by a plurality of patents.

9. The method of claim 1, wherein each technology domain comprises a set of artifacts that fulfills a specific generic function utilizing a particular and recognizable body of knowledge.

* * * * *